US012641090B1

(12) United States Patent
Kosgi et al.

(10) Patent No.: US 12,641,090 B1
(45) Date of Patent: May 26, 2026

(54) APPARATUS AND METHODS FOR CONTROLLING SENSITIVE CONTENT IN AN ELECTRONIC MESSAGE

(71) Applicant: NetImpact Strategies, Inc., Falls Church, VA (US)

(72) Inventors: Praveen Kosgi, Aldie, VA (US); Justin James Jones, Williamsburg, VA (US)

(73) Assignee: NETIMPACT STRATEGIES, INC., Falls Church, VA (US)

( * ) Notice: Subject to any disclaimer, the term of this patent is extended or adjusted under 35 U.S.C. 154(b) by 0 days.

(21) Appl. No.: 19/264,807

(22) Filed: Jul. 9, 2025

Related U.S. Application Data

(60) Provisional application No. 63/841,240, filed on Jul. 9, 2025.

(51) Int. Cl.
H04L 9/40 (2022.01)
(52) U.S. Cl.
CPC ........ H04L 63/123 (2013.01); H04L 63/0807 (2013.01)
(58) Field of Classification Search
None
See application file for complete search history.

(56) References Cited

U.S. PATENT DOCUMENTS

| | | | | |
|---|---|---|---|---|
| 11,392,691 | B1 * | 7/2022 | Wright | H04L 63/145 |
| 2018/0144048 | A1 * | 5/2018 | Kim | G06F 16/334 |
| 2018/0232528 | A1 * | 8/2018 | Williamson | G06F 21/6245 |

* cited by examiner

*Primary Examiner* — Nelson S. Giddins
(74) *Attorney, Agent, or Firm* — FisherBroyles, LLP; James J. Pohl

(57) ABSTRACT

Provided are methods and apparatus that control sensitive content of an electronic message. In an example, a computer-implemented method includes (i) identifying a pattern match by applying an expression pattern matching algorithm to a body of the electronic message; (ii) generating a quantitative score indicating a validity of the sensitive information in the pattern match by using an artificial intelligence algorithm configured with a sensitive information entity model to analyze the pattern match; (iii) determining, by applying a confidence calculator to the pattern match, a confidence score based on proximate content in the body of the electronic message; (iv) producing a final score by applying an algorithm to the quantitative score and the confidence score; and (v) sending, when the final score indicates sensitive information is present in the electronic message, a request for review to an administrator user device.

30 Claims, 16 Drawing Sheets

900

1100

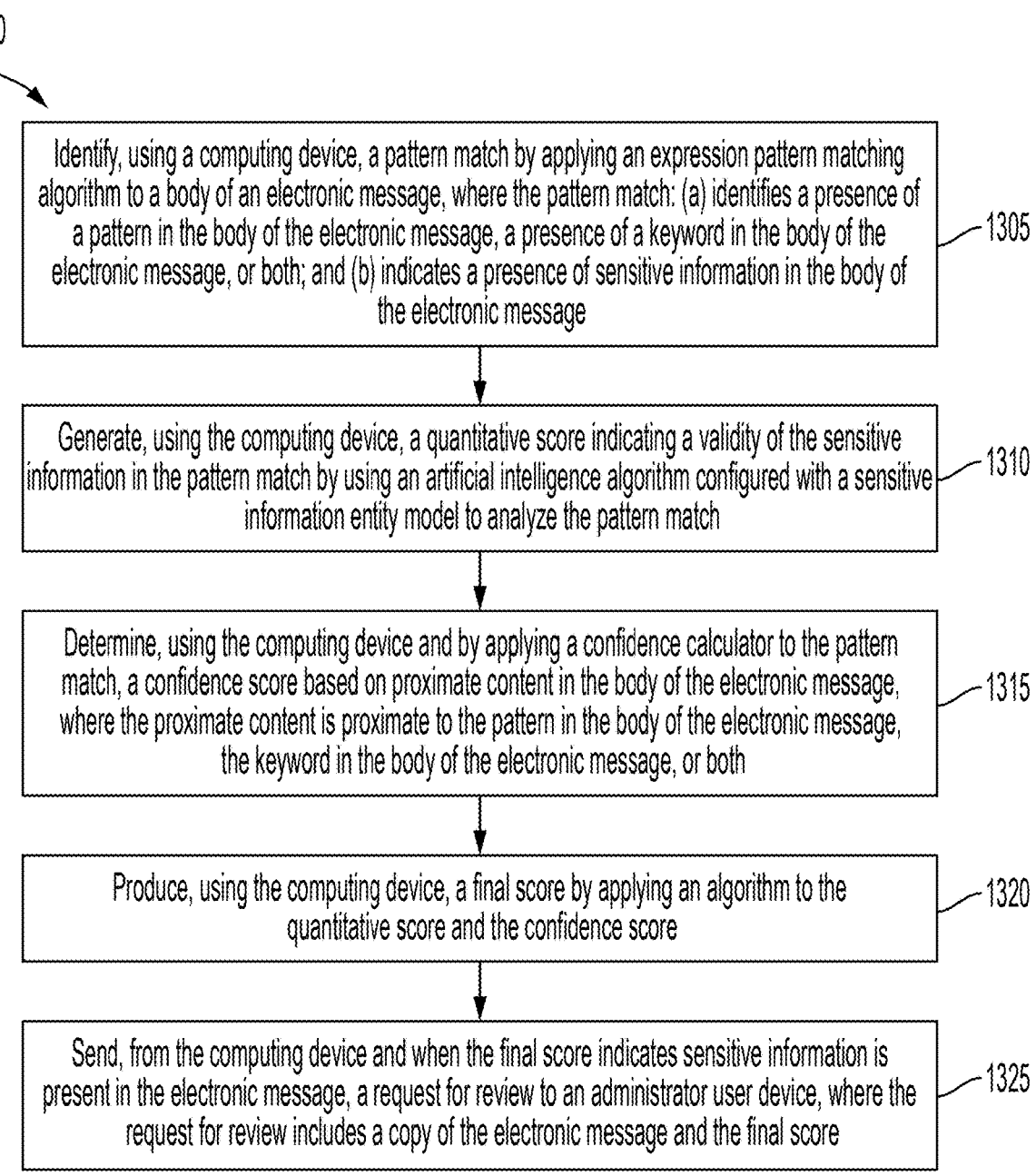

1300

Identify, using a computing device, a pattern match by applying an expression pattern matching algorithm to a body of an electronic message, where the pattern match: (a) identifies a presence of a pattern in the body of the electronic message, a presence of a keyword in the body of the electronic message, or both; and (b) indicates a presence of sensitive information in the body of the electronic message — 1305

Generate, using the computing device, a quantitative score indicating a validity of the sensitive information in the pattern match by using an artificial intelligence algorithm configured with a sensitive information entity model to analyze the pattern match — 1310

Determine, using the computing device and by applying a confidence calculator to the pattern match, a confidence score based on proximate content in the body of the electronic message, where the proximate content is proximate to the pattern in the body of the electronic message, the keyword in the body of the electronic message, or both — 1315

Produce, using the computing device, a final score by applying an algorithm to the quantitative score and the confidence score — 1320

Send, from the computing device and when the final score indicates sensitive information is present in the electronic message, a request for review to an administrator user device, where the request for review includes a copy of the electronic message and the final score — 1325

1408 PROCESSOR(S)

1410 I/O INTERFACE(S)

1412 MEMORY

1406

Network 1404-1

1404-2

1404-N

APPARATUS AND METHODS FOR CONTROLLING SENSITIVE CONTENT IN AN ELECTRONIC MESSAGE

CROSS-REFERENCE TO RELATED APPLICATION

The present non-provisional patent application claims priority to and the benefits of U.S. Provisional Patent Application No. 63/841,240, filed on Jul. 9, 2025, the disclosure of which is hereby incorporated herein in its entirety by specific reference thereto.

FIELD OF DISCLOSURE

This disclosure relates generally to the technical fields of electronics, computer-readable media, computer engineering, and more specifically, but not exclusively, to apparatus and methods for controlling content in an electronic message.

BACKGROUND

There is presently market demand for computer-implemented tools configured to control sensitive content in an electronic message. The market demand results at least in part from the detrimental effects of sending electronic messages that are unfiltered, under-filtered, or both. The market demand also results at least in part from a need for advanced computer-implemented tools that control sensitive content in an electronic message.

The detrimental effects of sending electronic messages that are unfiltered, under-filtered, or both unfiltered and under-filtered include unauthorized access of the sensitive information carried in the electronic messages. The sensitive information carried in the electronic messages can be intercepted in transit by attackers, such as by via packet sniffing, man-in-the-middle attacks, and the like. The sensitive information (e.g., personal information, financial information, proprietary data, etc.) can be viewed, recorded, altered, diverted, stolen, misused, exposed, broadcast, forwarded, or a combination thereof. Intercepted credentials and personal data can be reused in identity theft, phishing, social engineering attacks, infiltrating internal networks, and the like. The sensitive information carried in the electronic messages can be improperly disclosed to electronic devices that are not authorized to receive the sensitive information, not authorized to access the sensitive information, or both.

The detrimental effects of sending electronic messages that are unfiltered, under-filtered, or both include data breach and resultant legal liability. Exposure of sensitive information could result in a data breach, triggering legal obligations, such as breach notification laws. Organizations that are responsible for maintaining security of the sensitive information can face fines, lawsuits, regulatory penalties (e.g., under General Data Protection Regulation (GDPR), Health Insurance Portability and Accountability Act of 1996 (HIPAA), or similar laws), and the like.

A further detrimental effect of sending electronic messages that are unfiltered, under-filtered, or both is loss of confidentiality and trust in the organizations that are responsible for maintaining security of the sensitive information. Thus, customers and partners lose trust in the ability of the sender of the electronic message to protect the sensitive information therein. Accordingly, damage to reputation results in loss of business and professional relationships.

For these reasons, there is a need for advanced computer-implemented tools that control sensitive content in an electronic message in a manner that at least significantly mitigates, if not removes entirely, at least one detrimental effect of sending electronic messages that are unfiltered, under-filtered, or both. Accordingly, there are previously unaddressed and long-felt industry needs for methods and apparatus that improve upon conventional methods and conventional apparatus.

SUMMARY

As is described in greater detail herein, the instant disclosure describes apparatus and methods that control sensitive content in an electronic message. In examples, the provided methods and apparatus can identify sensitive content of an electronic message.

As described in greater detail herein, the instant disclosure describes various apparatus and methods for generating at least a portion of a machine configured to control sensitive content in an electronic message. In examples, the machine can include at least a portion of an electronic digital information management system configured as a set of computer-executable instructions (e.g. software instructions), where the computer-executable instructions can be stored on a suitable non-transitory computer-readable data storage element, a suitable non-transitory computer-readable medium, or both. The provided systems and methods address the previously unaddressed and long-felt industry needs for methods and apparatus that improve upon the conventional methods and the conventional apparatus.

In an example, provided is a computer-implemented method for automatically generating at least a portion of a machine configured to control sensitive content in an electronic message. The method can be performed by a computing device comprising at least one processor. In examples, the method can include: (i) identifying, by the computing device, a pattern match by applying an expression pattern matching algorithm to a body of the electronic message, where the pattern match: (a) identifies a presence of a pattern in the body of the electronic message, a presence of a keyword in the body of the electronic message, or both; and (b) indicates a presence of sensitive information in the body of the electronic message; (ii) generating, by the computing device, a quantitative score indicating a validity of the sensitive information in the pattern match by using an artificial intelligence algorithm configured with a sensitive information entity model to analyze the pattern match; (iii) determining, by the computing device and by applying a confidence calculator to the pattern match, a confidence score based on proximate content in the body of the electronic message, where the proximate content is proximate to the pattern in the body of the electronic message, the keyword in the body of the electronic message, or both; (iv) producing, by the computing device, a final score by applying an algorithm to the quantitative score and the confidence score; and (v) sending, from the computing device and when the final score indicates sensitive information is present in the electronic message, a request for review to an administrator user device, where the request for review includes a copy of the electronic message and the final score.

In an example, the method can further include receiving, at the computing device and from a subscribed application, an application programming interface call to initiate controlling content in the electronic message.

In an example, the method can further include receiving, from a subscribed application, the electronic message having the pattern in the body of the electronic message, the keyword in the body of the electronic message, or both.

In an example, the method can further include verifying registration of a subscribed application.

In an example, the verifying the registration of the subscribed application can further include: (i) sending, from the computing device and to a database, a verification request including information describing the subscribed application; and (ii) receiving, at the computing device, a verification response from the database.

In an example, the method can further include (i) authenticating a subscribed application; (ii) performing token-based authentication of the subscribed application; or (iii) both.

In an example, the authenticating the subscribed application can further include: (i) sending, from the computing device and to an identity and access management device, an authentication request including information describing the subscribed application; and (ii) receiving, at the computing device and from the identity and access management device, an authentication response indicating the application is authentic.

In an example, the method can further include (i) publishing a quality management notification for message validation; and (ii) initiating, in response to the published quality management notification, message validation.

In an example, the method can further include validating a block list.

In an example, the method can further include initiating, for a new message recipient, an opt-in process comprising: (i) sending an opt-in request via a message service device to a recipient user device; (ii) receiving an opt-in confirmation via the message service device from the recipient user device; and (iii) enabling, in response to the opt-in confirmation, administration and configuration services of the computing device via an application programming interface.

In an example, the method can further include updating, in response to the enabling the administration and configuration services via the application programming interface, a database including information describing message recipients.

In an example, the sensitive information in the body of the electronic message can include: (i) personally identifiable information; (ii) personal health information; (iii) a postal address; (iv) a social security number; (v) a phone number; (vi) privacy sensitive information; (vii) national security sensitive information; (viii) classified information; (ix) unclassified information; (x) secret information; (xi) top secret information; or (xii) a combination thereof.

In an example, the determining the confidence score can further include calculating a distance between: (i) the pattern in the body of the electronic message or the keyword in the body of the electronic message; and (ii) another keyword in the electronic message.

In an example, the sensitive information entity model can be: (i) a personally identifiable information entity model trained to analyze the pattern match; (ii) a personal health information entity model trained to analyze the pattern match; (iii) a postal address entity model trained to analyze the pattern match; (iv) a social security number entity model trained to analyze the pattern match; (v) a phone number entity model trained to analyze the pattern match; (vi) a privacy sensitive information entity model trained to analyze the pattern match; (vii) a national security sensitive information entity model trained to analyze the pattern match; (viii) a classified information entity model trained to analyze the pattern match; (ix) a unclassified information entity model trained to analyze the pattern match; (x) a secret information entity model trained to analyze the pattern match; (xi) a top secret information entity model trained to analyze the pattern match; or (xii) a combination thereof.

In an example, the method can further include comparing the final score to a threshold value to determine the final score indicates sensitive information is present in the electronic message.

In an example, the method can further include: (i) receiving, via the user device, information indicating approval to send the electronic message; and (ii) sending, in response to the receiving the information indicating approval, the electronic message to a recipient user device via a message service device.

In an example, the method can further include sending, in response to the sending the electronic message to the recipient user device via the message service device, a notification to the administrator user device that the electronic message was sent.

In an example, the method can further include: (i) receiving a delivery confirmation message via the message service device, where the delivery confirmation message includes payload information; and (ii) forwarding, to a return uniform resource locator of a subscribed application, the payload information.

In an example, the method can further include storing, in response to the receiving the information indicating approval, status update information in a database.

In an example, the message service device can be: (i) a short message service device; (ii) a multimedia messaging device; (iii) a rich communication services device; (iv) a text message server; (v) a chat message server; (vi) a messaging transmission channel device; (vii) a messaging channel delivery device; (viii) a cross-platform messaging service device; (ix) an email server; (x) an Internet messaging server; (xi) an instant messaging server; (xii) an encrypted messaging server; (xiii) a video conference server; (xiv) a message delivery channel device; (xv) a transmission delivery channel device; (xvi) a part of a multiprovider architecture; or (xvii) a combination thereof.

In an example, the method can further include sending, from the computing device and when the final score indicates sensitive information is present in the electronic message, an error message to the subscribed application.

In an example, the method can further include training, using training information, the artificial intelligence algorithm to identify the presence of sensitive information in electronic messages, where: (i) the training information includes digital information indicating electronic message content known to include sensitive information; and (ii) the artificial intelligence algorithm is logically separated from a public-facing network.

In an example, the method can further include: (i) receiving, from the administrator user device, a response to the request for review; (ii) producing, in response to receiving the response to the request for review, updated training information including at least a portion of the information in the electronic message; (iii) retraining, automatically and using the updated training information, the artificial intelligence algorithm to identify the presence of sensitive information in electronic messages.

In an example, the method can further include training, using training information, the artificial intelligence algorithm to determine the confidence score, where: (i) the training information includes digital information indicating electronic message content known to include sensitive information; and (ii) the artificial intelligence algorithm is logically separated from a public-facing network.

In an example, the method can further include: (i) receiving, from the administrator user device, a response to the request for review; (ii) producing, in response to receiving the response to the request for review, updated training information including at least a portion of the information in the electronic message; and (iii) retraining, automatically and using the updated training information, the artificial intelligence algorithm to determine the confidence score.

In an example, the method can further include configuring the expression pattern matching algorithm to match a specific pattern that is based on a format of a type of sensitive information.

In an example, the method can further include: (i) receiving, from the administrator user device, a response to the request for review; and (ii) reconfiguring, automatically and in response to receiving the response to the request for review, the expression pattern matching algorithm with a specific pattern based on a format of a type of sensitive information in at least a portion of the electronic message.

In an example, the method can further include: (i) receiving, at the administrator user device, an identity verification card authentication request; (ii) sending the identity verification card authentication request to an identity and access management device; (iii) receiving an identity verification card response from the identity and access management device; and (iv) sending, in response to receiving the identity verification card response, an authentication token to the administrator user device.

In an example, the electronic message can be: (i) addressed to multiple recipient user devices; (ii) in a plurality of electronic messages sent simultaneously; (iii) a text message; (iv) a text message sent in a bulk text; (v) a short message service message; (vi) a multimedia message; (vii) a rich communication services message; (viii) an email; (ix) an instant message; (x) an encrypted message; or (xi) a combination thereof.

In an example, the electronic message can be received from a subscribed application and addressed to another application.

In examples, provided is a system configured to generate at least a portion of a machine configured to control sensitive content in an electronic message. The system can include (i) an electronic processor configured to execute a set of computer-executable instructions, (ii) a user display device communicatively coupled to the electronic processor; and (iii) a memory communicatively coupled to the electronic processor and storing the set of computer-executable instructions. The set of computer-executable instructions can be configured to cause the electronic processor to perform at least a portion of a method described herein.

In an example, provided is a system configured to automatically generate at least a portion of a machine configured to control sensitive content in an electronic message. The system can include (i) an electronic processor configured to execute a set of computer-executable instructions, (ii) a user display device communicatively coupled to the electronic processor; and (iii) a memory communicatively coupled to the electronic processor and storing the set of computer-executable instructions. The set of computer-executable instructions can be configured to cause the electronic processor to: (i) identify, by the electronic processor, a pattern match by applying an expression pattern matching algorithm to a body of the electronic message, where the pattern match: (a) identifies a presence of a pattern in the body of the electronic message, a presence of a keyword in the body of the electronic message, or both; and (b) indicates a presence of sensitive information in the body of the electronic message; (ii) generate, by the electronic processor, a quantitative score indicating a validity of the sensitive information in the pattern match by using an artificial intelligence algorithm configured with a sensitive information entity model to analyze the pattern match; (iii) determine, by the electronic processor and by applying a confidence calculator to the pattern match, a confidence score based on proximate content in the body of the electronic message, where the proximate content is proximate to the pattern in the body of the electronic message, the keyword in the body of the electronic message, or both; (iv) produce, by the electronic processor, a final score by applying an algorithm to the quantitative score and the confidence score; and (v) send, from the electronic processor and when the final score indicates sensitive information is present in the electronic message, a request for review to an administrator user device, where the request for review includes a copy of the electronic message and the final score.

In an example, the memory can further store instructions configured to cause the processor to receive, at the electronic processor and from a subscribed application, an application programming interface call to initiate controlling content in the electronic message.

In an example, the memory can further store instructions configured to cause the processor to receive, from a subscribed application, the electronic message having the pattern in the body of the electronic message, the keyword in the body of the electronic message, or both.

In an example, the memory can further store instructions configured to cause the processor to verify registration of a subscribed application.

In an example, the verifying the registration of the subscribed application can further include: (i) sending, from the electronic processor to a database, a verification request including information describing the subscribed application; and (ii) receiving, at the electronic processor, a verification response from the database.

In an example, the memory can further store instructions configured to cause the processor to (i) authenticate a subscribed application; (ii) perform token-based authentication of the subscribed application; or (iii) both.

In an example, the authenticating the subscribed application can further include: (i) sending, from the electronic processor and to an identity and access management device, an authentication request including information describing the subscribed application; and (ii) receiving, at the electronic processor and from the identity and access management device, an authentication response indicating the application is authentic.

In an example, the memory can further store instructions configured to cause the processor to (i) publish a quality management notification for message validation; and (ii) initiate, in response to the published quality management notification, message validation.

In an example, the memory can further store instructions configured to cause the processor to validate a block list.

In an example, the memory can further store instructions configured to cause the processor to initiate, for a new message recipient, an opt-in process comprising: (i) sending an opt-in request via a message service device to a recipient user device; (ii) receiving an opt-in confirmation via the message service device from the recipient user device; and (iii) enabling, in response to the opt-in confirmation, administration and configuration services of the electronic processor via an application programming interface.

In an example, the memory can further store instructions configured to cause the processor to update, in response to the enabling the administration and configuration services via the application programming interface, a database including information describing message recipients.

In an example, the sensitive information in the body of the electronic message can include: (i) personally identifiable information; (ii) personal health information; (iii) a postal address; (iv) a social security number; (v) a phone number; (vi) privacy sensitive information; (vii) national security sensitive information; (viii) classified information; (ix) unclassified information; (x) secret information; (xi) top secret information; or (xii) a combination thereof.

In an example, the determining the confidence score can further include calculating a distance between: (i) the pattern in the body of the electronic message or the keyword in the body of the electronic message; and (ii) another keyword in the electronic message.

In an example, the sensitive information entity model can be: (i) a personally identifiable information entity model trained to analyze the pattern match; (ii) a personal health information entity model trained to analyze the pattern match; (iii) a postal address entity model trained to analyze the pattern match; (iv) a social security number entity model trained to analyze the pattern match; (v) a phone number entity model trained to analyze the pattern match; (vi) a privacy sensitive information entity model trained to analyze the pattern match; (vii) a national security sensitive information entity model trained to analyze the pattern match; (viii) a classified information entity model trained to analyze the pattern match; (ix) a unclassified information entity model trained to analyze the pattern match; (x) a secret information entity model trained to analyze the pattern match; (xi) a top secret information entity model trained to analyze the pattern match; or (xii) a combination thereof.

In an example, the memory can further store instructions configured to cause the processor to compare the final score to a threshold value to determine the final score indicates sensitive information is present in the electronic message.

In an example, the memory can further store instructions configured to cause the processor to (i) receive, via the administrator user device, information indicating approval to send the electronic message; and (ii) send, in response to the receiving the information indicating approval, the electronic message to a recipient user device via a message service device.

In an example, the memory can further store instructions configured to cause the processor to send, in response to the sending the electronic message to the recipient user device via the message service device, a notification to the administrator user device that the electronic message was sent.

In an example, the memory can further store instructions configured to cause the processor to (i) receive a delivery confirmation message via the message service device, where the delivery confirmation message includes payload information; and (ii) forward, to a return uniform resource locator of a subscribed application, the payload information.

In an example, the memory can further store instructions configured to cause the processor to store, in response to the receiving the information indicating approval, status update information in a database.

In an example, the message service device can be: (i) a short message service device; (ii) a multimedia messaging device; (iii) a rich communication services device; (iv) a text message server; (v) a chat message server; (vi) a messaging transmission channel device; (vii) a messaging channel delivery device; (viii) a cross-platform messaging service device; (ix) an email server; (x) an Internet messaging server; (xi) an instant messaging server; (xii) an encrypted messaging server; (xiii) a video conference server; (xiv) a message delivery channel device; (xv) a transmission delivery channel device; (xvi) a part of a multiprovider architecture; or (xvii) a combination thereof.

In an example, the memory can further store instructions configured to cause the processor to send, from the electronic processor and when the final score indicates sensitive information is present in the electronic message, an error message to the subscribed application.

In an example, the memory can further store instructions configured to cause the processor to train, using training information, the artificial intelligence algorithm to identify the presence of sensitive information in electronic messages, where: (i) the training information includes digital information indicating electronic message content known to include sensitive information; and (ii) the artificial intelligence algorithm is logically separated from a public-facing network.

In an example, the memory can further store instructions configured to cause the processor to (i) receive, from the administrator user device, a response to the request for review; (ii) produce, in response to receiving the response to the request for review, updated training information including at least a portion of the information in the electronic message; and (iii) retrain, automatically and using the updated training information, the artificial intelligence algorithm to identify the presence of sensitive information in electronic messages.

In an example, the memory can further store instructions configured to cause the processor to train, using training information, the artificial intelligence algorithm to determine the confidence score, where: (i) the training information includes digital information indicating electronic message content known to include sensitive information; and (ii) the artificial intelligence algorithm is logically separated from a public-facing network.

In an example, the memory can further store instructions configured to cause the processor to (i) receive, from the administrator user device, a response to the request for review; (ii) produce, in response to receiving the response to the request for review, updated training information including at least a portion of the information in the electronic message; and (iii) retrain, automatically and using the updated training information, the artificial intelligence algorithm to determine the confidence score.

In an example, the memory can further store instructions configured to cause the processor to configure the expression pattern matching algorithm to match a specific pattern that is based on a format of a type of sensitive information.

In an example, the memory can further store instructions configured to cause the processor to (i) receive, from the administrator user device, a response to the request for review; and (ii) reconfigure, automatically and in response to receiving the response to the request for review, the expression pattern matching algorithm with a specific pattern based on a format of a type of sensitive information in at least a portion of the electronic message.

In an example, the memory can further store instructions configured to cause the processor to (i) receive, at the administrator user device, an identity verification card authentication request;

(ii) send the identity verification card authentication request to an identity and access management device; (iii) receive an identity verification card response from the identity and access management device; and (iv) send, in response to receiving the identity verification card response, an authentication token to the administrator user device.

In an example, the electronic message can be: (i) addressed to multiple recipient user devices; (ii) in a plurality of electronic messages sent simultaneously; (iii) a text message; (iv) a text message sent in a bulk text; (v) a short message service message; (vi) a multimedia message; (vii) a rich communication services message; (viii) an email; (ix) an instant message; (x) an encrypted message; or (xi) a combination thereof.

In an example, the electronic message can be received from a subscribed application and addressed to another application.

Embodiments of the disclosed systems and methods are directed to processes and techniques, including at least partially automated processes and at least partially automated techniques, to generate at least a portion of a machine configured to control sensitive content in an electronic message. In some embodiments, the disclosed systems include computer architecture components that can provide interfaces, code snippets, data structures, and information relationships to enable generating at least a portion of a machine configured to control sensitive content in an electronic message.

In an embodiment, the disclosure is directed to an apparatus configured to generate at least a portion of a machine configured to control sensitive content in an electronic message.

The apparatus can include a non-transitory computer-readable medium storing a set of computer-executable instructions and an electronic processor or electronic co-processors. When executed by the electronic processor or electronic co-processors, the instructions can cause the electronic processor or electronic co-processors (or a device of which they are part) to perform a set of operations that implement at least a portion of a disclosed method.

In an embodiment, the disclosure is directed to a non-transitory computer-readable medium storing a set of computer-executable instructions, where the set of instructions can be executed by an electronic processor or co-processors to cause the processor or co-processors (or a device of which the processor or co-processors are a constituent part) to perform a set of operations that implement at least a portion of a disclosed method.

In an example, provided is a non-transitory computer-readable medium, comprising processor-executable instructions stored thereon configured to cause a processor to perform at least a portion of a method described herein.

In an example, provided is a non-transitory computer-readable medium, comprising processor-executable instructions stored thereon configured to cause a processor to perform at least a portion of a function described herein.

In an example, provided is a non-transitory computer-readable medium, comprising processor-executable instructions stored thereon configured to cause a processor to: (i) identify, by the processor, a pattern match by applying an expression pattern matching algorithm to a body of the electronic message, where the pattern match: (a) identifies a presence of a pattern in the body of the electronic message, a presence of a keyword in the body of the electronic message, or both; and (b) indicates a presence of sensitive information in the body of the electronic message; (ii) generate, by the processor, a quantitative score indicating a validity of the sensitive information in the pattern match by using an artificial intelligence algorithm configured with a sensitive information entity model to analyze the pattern match; (iii) determine, by the processor and by applying a confidence calculator to the pattern match, a confidence score based on proximate content in the body of the electronic message, where the proximate content is proximate to the pattern in the body of the electronic message, the keyword in the body of the electronic message, or both; (iv) produce, by the processor, a final score by applying an algorithm to the quantitative score and the confidence score; and (v) send, from the processor and when the final score indicates sensitive information is present in the electronic message, a request for review to an administrator user device, where the request for review includes a copy of the electronic message and the final score.

In an example, the non-transitory computer-readable medium can further include processor-executable instructions stored thereon configured to cause the processor to receive, at the processor and from a subscribed application, an application programming interface call to initiate controlling content in the electronic message.

In an example, the non-transitory computer-readable medium can further include processor-executable instructions stored thereon configured to cause the processor to receive, from a subscribed application, the electronic message having the pattern in the body of the electronic message, the keyword in the body of the electronic message, or both.

In an example, the non-transitory computer-readable medium can further include processor-executable instructions stored thereon configured to cause the processor to verify registration of a subscribed application.

In an example, the verifying the registration of the subscribed application can further include: (i) sending, from the processor and to a database, a verification request including information describing the subscribed application; and (ii) receiving, at the processor, a verification response from the database.

In an example, the non-transitory computer-readable medium can further include processor-executable instructions stored thereon configured to cause the processor to: (i) authenticate a subscribed application; (ii) perform token-based authentication of the subscribed application; or (iii) both.

In an example, the authenticating the subscribed application can further include: (i) send, from the processor and to an identity and access management device, an authentication request including information describing the subscribed application; and (ii) receive, at the processor and from the identity and access management device, an authentication response indicating the application is authentic.

In an example, the non-transitory computer-readable medium can further include processor-executable instructions stored thereon configured to cause the processor to: (i) publish a quality management notification for message validation; and (ii) initiate, in response to the published quality management notification, message validation.

In an example, the non-transitory computer-readable medium can further include processor-executable instructions stored thereon configured to cause the processor to validate a block list.

In an example, the non-transitory computer-readable medium can further include processor-executable instructions stored thereon configured to cause the processor to initiate, for a new message recipient, an opt-in process comprising: (i) sending an opt-in request via a message service device to a recipient user device; (ii) receiving an opt-in confirmation via the message service device from the recipient user device; and (iii) enabling, in response to the opt-in confirmation, administration and configuration services of the processor via an application programming interface.

In an example, the non-transitory computer-readable medium can further include processor-executable instructions stored thereon configured to cause the processor to update, in response to the enabling the administration and configuration services via the application programming interface, a database including information describing message recipients.

In an example, the sensitive information in the body of the electronic message can include: (i) personally identifiable information; (ii) personal health information; (iii) a postal address; (iv) a social security number; (v) a phone number; (vi) privacy sensitive information; (vii) national security sensitive information; (viii) classified information; (ix) unclassified information; (x) secret information; (xi) top secret information; or (xii) a combination thereof.

In an example, the determining the confidence score can further include calculating a distance between: (i) the pattern in the body of the electronic message or the keyword in the body of the electronic message; and (ii) another keyword in the electronic message.

In an example, the sensitive information entity model can be: (i) a personally identifiable information entity model trained to analyze the pattern match; (ii) a personal health information entity model trained to analyze the pattern match; (iii) a postal address entity model trained to analyze the pattern match; (iv) a social security number entity model trained to analyze the pattern match; (v) a phone number entity model trained to analyze the pattern match; (vi) a privacy sensitive information entity model trained to analyze the pattern match; (vii) a national security sensitive information entity model trained to analyze the pattern match; (viii) a classified information entity model trained to analyze the pattern match; (ix) a unclassified information entity model trained to analyze the pattern match; (x) a secret information entity model trained to analyze the pattern match; (xi) a top secret information entity model trained to analyze the pattern match; or (xii) a combination thereof.

In an example, the non-transitory computer-readable medium can further include processor-executable instructions stored thereon configured to cause the processor to compare the final score to a threshold value to determine the final score indicates sensitive information is present in the electronic message.

In an example, the non-transitory computer-readable medium can further include processor-executable instructions stored thereon configured to cause the processor to: (i) receive, via the administrator user device, information indicating approval to send the electronic message; and (ii) send, in response to the receiving the information indicating approval, the electronic message to a recipient user device via a message service device.

In an example, the non-transitory computer-readable medium can further include processor-executable instructions stored thereon configured to cause the processor to send, in response to the sending the electronic message to the recipient user device via the message service device, a notification to the administrator user device that the electronic message was sent.

In an example, the non-transitory computer-readable medium can further include processor-executable instructions stored thereon configured to cause the processor to: (i) receive a delivery confirmation message via the message service device, where the delivery confirmation message includes payload information; and (ii) forward, to a return uniform resource locator of a subscribed application, the payload information.

In an example, the non-transitory computer-readable medium can further include processor-executable instructions stored thereon configured to cause the processor to store, in response to the receiving the information indicating approval, status update information in a database.

In an example, the message service device can be: (i) a short message service device; (ii) a multimedia messaging device; (iii) a rich communication services device; (iv) a text message server; (v) a chat message server; (vi) a messaging transmission channel device; (vii) a messaging channel delivery device; (viii) a cross-platform messaging service device; (ix) an email server; (x) an Internet messaging server; (xi) an instant messaging server; (xii) an encrypted messaging server; (xiii) a video conference server; (xiv) a message delivery channel device; (xv) a transmission delivery channel device; (xvi) a part of a multiprovider architecture; or (xvii) a combination thereof.

In an example, the non-transitory computer-readable medium can further include processor-executable instructions stored thereon configured to cause the processor to send, from the processor and when the final score indicates sensitive information is present in the electronic message, an error message to the subscribed application.

In an example, the non-transitory computer-readable medium can further include processor-executable instructions stored thereon configured to cause the processor to train, using training information, the artificial intelligence algorithm to identify the presence of sensitive information in electronic messages, where: (i) the training information includes digital information indicating electronic message content known to include sensitive information; and (ii) the artificial intelligence algorithm is logically separated from a public-facing network.

In an example, the non-transitory computer-readable medium can further include processor-executable instructions stored thereon configured to cause the processor to: (i) receive, from the administrator user device, a response to the request for review; (ii) produce, in response to receiving the response to the request for review, updated training information including at least a portion of the information in the electronic message; and (iii) retrain, automatically and using the updated training information, the artificial intelligence algorithm to identify the presence of sensitive information in electronic messages.

In an example, the non-transitory computer-readable medium can further include processor-executable instructions stored thereon configured to cause the processor to train, using training information, the artificial intelligence algorithm to determine the confidence score, where: (i) the training information includes digital information indicating electronic message content known to include sensitive information; and (ii) the artificial intelligence algorithm is logically separated from a public-facing network.

In an example, the non-transitory computer-readable medium can further include processor-executable instructions stored thereon configured to cause the processor to: (i) receive, from the administrator user device, a response to the request for review; (ii) produce, in response to receiving the response to the request for review, updated training information including at least a portion of the information in the electronic message; and (iii) retrain, automatically and using the updated training information, the artificial intelligence algorithm to determine the confidence score.

In an example, the non-transitory computer-readable medium can further include processor-executable instructions stored thereon configured to cause the processor to configure the expression pattern matching algorithm to match a specific pattern that is based on a format of a type of sensitive information.

In an example, the non-transitory computer-readable medium can further include processor-executable instructions stored thereon configured to cause the processor to: (i) receive, from the administrator user device, a response to the request for review; and (ii) reconfigure, automatically and in response to receiving the response to the request for review, the expression pattern matching algorithm with a specific pattern based on a format of a type of sensitive information in at least a portion of the electronic message.

In an example, the non-transitory computer-readable medium can further include processor-executable instructions stored thereon configured to cause the processor to: (i) receive, at the administrator user device, an identity verification card authentication request; (ii) send the identity verification card authentication request to an identity and access management device; (iii) receive an identity verification card response from the identity and access management device; and (iv) send, in response to receiving the identity verification card response, an authentication token to the administrator user device.

In an example, the electronic message can be: (i) addressed to multiple recipient user devices; (ii) in a plurality of electronic messages sent simultaneously; (iii) a text message; (iv) a text message sent in a bulk text; (v) a short message service message; (vi) a multimedia message; (vii) a rich communication services message; (viii) an email; (ix) an instant message; (x) an encrypted message; or (xi) a combination thereof.

In an example, the electronic message can be received from a subscribed application and addressed to another application.

In some embodiments, the systems and methods disclosed herein can provide services through a software as a service (Saas), a multi-tenant platform, or a combination thereof. The multi-tenant platform can provide access to multiple entities (e.g. tenants), each with a separate account and associated data storage. Each account can correspond to a user, set of users, an entity, a set or category of entities, a company, a business advisor, a set or category of users, an industry, an organization, or a combination thereof, as examples. Each account can access one or more services, a set of which are instantiated in their account, and which initiate at least a portion of one or more of the methods disclosed herein. Each account can access one or more services, a set of which are instantiated in their account, and which initiate at least a portion of one or more of the functions disclosed herein.

The terms "invention," "the invention," "this invention," "the present invention," "the present disclosure," or "the disclosure" as used herein are intended to refer broadly to all subject matter disclosed by this document, the drawings (i.e. the Figures), and the claims. Statements containing these terms do not limit the subject matter disclosed or the meaning or scope of the claims. Embodiments covered by this disclosure are defined by the claims and not by this summary. This summary is a high-level overview of various examples and aspects of the disclosure and introduces some concepts that are further described in detail hereby. This summary is not intended to identify key, essential, or required features of the claimed subject matter, nor is it intended to be used in isolation to determine the scope of the claimed subject matter. The subject matter should be understood by reference to appropriate portions of the entire specification, to any or all figures or drawings, and to each claim.

Advantages of the provided systems, apparatuses, and methods will be apparent to one of ordinary skill in the art upon review of the detailed description and the included Figures. While the exemplary embodiments provided hereby are susceptible to various modifications and alternative forms, specific embodiments are shown by way of example in the drawings and are described in detail herein. However, the exemplary or specific embodiments are not intended to be limited to the forms described. Rather, the disclosure covers all modifications, equivalents, and alternatives falling within the scope of the appended claims.

BRIEF DESCRIPTION OF THE DRAWINGS

The accompanying drawings are presented to describe examples of the present teachings and are not limiting. Together with this following description, the drawings demonstrate and explain various principles of the present disclosure.

Embodiments of the disclosure are described with reference to the drawings, in which:

FIG. 13 depicts an example block diagram of an example method that can be used to implement automatically generating and using at least a portion of a machine configured to control sensitive content in an electronic message, in accordance with an embodiment of the disclosure.

Figure 1:
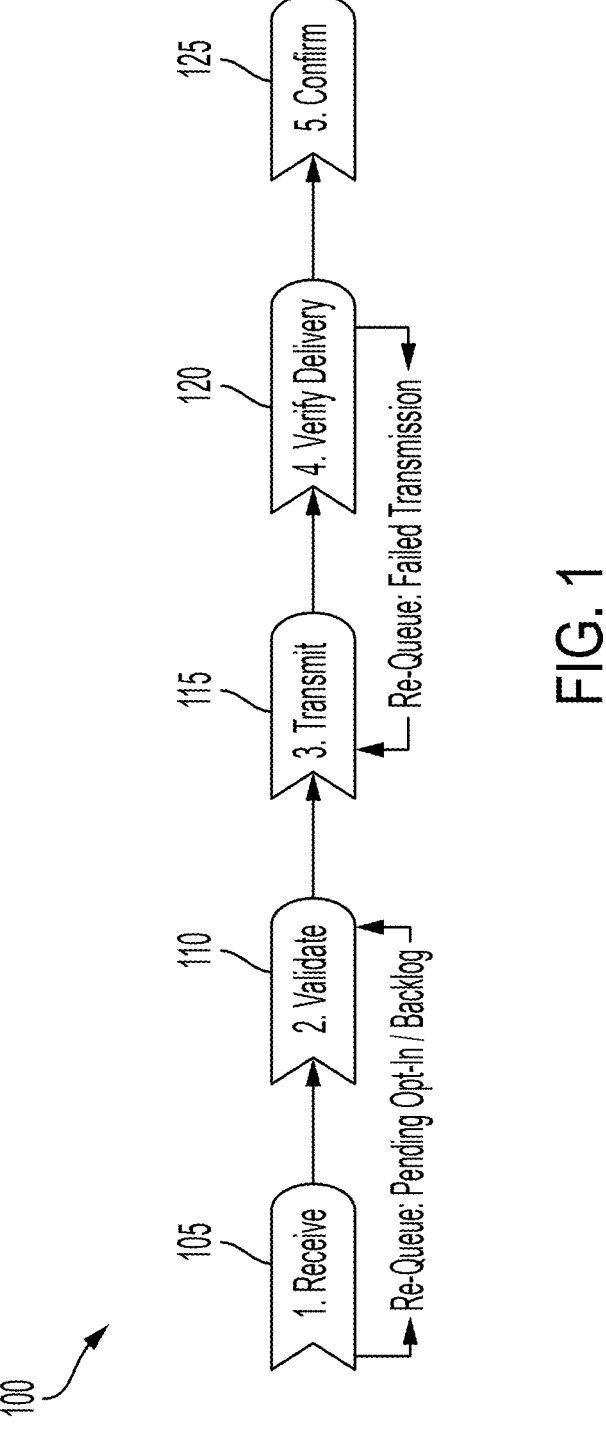
FIG. 1 depicts an block diagram of an example overview of a method for automatically controlling content in an electronic message, in accordance with an embodiment of the disclosure.

Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are example methods and apparatuses that can be used to automatically control sensitive content in electronic message. In examples, the provided methods and apparatuses can advantageously automatically generate a machine that filters content of electronic message. In some examples, the provided methods and apparatuses can advantageously automatically generate an information management machine. The provided methods and apparatuses address the aforementioned previously unaddressed and long-felt industry needs for methods and apparatus that improve upon conventional methods and conventional apparatus.

The provided methods and apparatuses can perform data loss prevention (DLP) and artificial intelligence (AI) methods that protect personally identifiable information (PII), personal health information (PHI), sensitive information, or a combination thereof that is found in a body of an electronic message.

The provided methods and apparatuses provide many features and advantages.

In examples, the provided methods and apparatuses can scan, filter, and control electronic messages prior to those messages being delivered to a publicly accessible network.

In examples, the provided methods and apparatuses can provide in-stream controlling of sensitive content in electronic messages that can support any number of application programming interfaces as application interfaces. In examples the provided methods and apparatuses can be an email server configured to perform controlling of sensitive content in electronic messages, a chat service configured to perform controlling of sensitive content in electronic messages, or a combination thereof.

In examples, the provided methods and apparatuses can provide advanced computer-implemented tools that can control sensitive content in an electronic message transferred between computer applications, where the controlling of sensitive content at least mitigates, if not removes entirely, at least one aforementioned detrimental effect of sending electronic messages that are unfiltered, under-filtered, or both.

In some examples, the provided methods and apparatuses can provide advanced computer-implemented tools that can control sensitive content in an electronic message using at least one instance of an application that serves multiple customers (i.e. "tenants") while maintaining data and configuration isolation between the multiple customers, where the controlling of sensitive content at least mitigates, if not removes entirely, at least one aforementioned detrimental effect of sending electronic messages that are unfiltered, under-filtered, or both.

In examples, the provided methods and apparatuses can provide advanced and scalable computer-implemented tools that can control sensitive content of an electronic message using at least one instance of an application that serves multiple customers while maintaining data and configuration isolation between the multiple customers, where the controlling of sensitive content at least mitigates, if not removes entirely, at least one aforementioned detrimental effect of sending electronic messages that are unfiltered, under-filtered, or both.

In some embodiments, the provided methods and apparatuses can provide advanced computer-implemented tools that can include an artificial intelligence algorithm that is logically separated from a public-facing network and that can filters content of an electronic message to at least mitigate, if not remove entirely, at least one aforementioned detrimental effect of sending electronic messages that are unfiltered, under-filtered, or both.

In examples, the provided methods and apparatuses can provide advanced computer-implemented tools that can train an artificial intelligence that is logically separated from a public-facing network and that filters content of an electronic message to at least mitigate, if not remove entirely, at least one aforementioned detrimental effect of sending electronic messages that are unfiltered, under-filtered, or both.

In examples, the provided methods and apparatuses can provide advanced computer-implemented tools that can authenticate an electronic message to at least mitigate, if not remove entirely, at least one detrimental effect of sending electronic messages that are unfiltered, under-filtered, or both.

In embodiments, the provided methods and apparatuses can provide advanced computer-implemented tools that can validate an electronic message to at least mitigate, if not remove entirely, at least one detrimental effect of sending electronic messages that are unfiltered, under-filtered, or both.

In examples, the provided methods and apparatuses can provide advanced computer-implemented tools that can detect data leaks of content of an electronic message, where the detecting at least mitigates, if not removes entirely, at least one aforementioned detrimental effect of sending electronic messages that are unfiltered, under-filtered, or both.

In examples, the provided methods and apparatuses can provide advanced computer-implemented tools that can control sending an electronic message, via a public-accessible network, in a manner that at least mitigates, if not removes entirely, at least one aforementioned detrimental effect of sending electronic messages that are unfiltered, under-filtered, or both.

In examples, the provided methods and apparatuses can provide advanced computer-implemented tools that can control sensitive content in electronic messages having different formats in a manner that at least mitigates, if not removes entirely, at least one aforementioned detrimental effect of sending electronic messages that are unfiltered, under-filtered, or both.

In some examples, the provided methods and apparatuses can advantageously provide intelligent, real-time analysis of electronic messages to detect the presence of PII, PHI, sensitive information, or a combination thereof within the electronic messages.

In some examples, the provided methods and apparatuses can advantageously provide a pluggable architecture that can fit into existing workflows.

In some examples, the provided methods and apparatuses can advantageously provide a configurable and trainable artificial intelligence function that adapts to customer-specific use cases.

In examples, the provided methods and apparatuses can advantageously provide a unique architecture that supports distributed processing of messages for receiving, validation, and transmission, without directly exposing sensitive networks to electronic message service providers and the public switched telephone network.

In some examples, the provided methods and apparatuses can advantageously provide explicitly separated inbound and outbound communications with networks, queues, and processing services for separation of internal and external security boundaries.

In some examples, the provided methods and apparatuses can advantageously provide secure traffic control with layered security to deliver and receive electronic messages.

In some examples, the provided methods and apparatuses can advantageously provide an air-gapped installation for components of the system in compliance with sensitive environment compliance requirements. In some examples, the provided methods and apparatuses can advantageously provide an air-gapped installation for all components of the system.

In some examples, the provided methods and apparatuses can advantageously provide millisecond-based processing of the techniques described herein, including electronic message processing such as content scanning, flagging, and administrative message flow controls.

In some examples, the provided methods and apparatuses can advantageously provide guaranteed receive and delivery of messages from subscribed applications with advanced logging and persistence capabilities.

In some examples, the provided methods and apparatuses can advantageously provide sensitive information scanning for national security, PII, PHI, and other types of sensitive information with trainable AI models and algorithms. In some examples, the provided methods and apparatuses can advantageously provide sensitive information scanning for national security, PII, PHI, and other types of sensitive information with trained AI models and algorithms.

In some examples, the provided methods and apparatuses can advantageously provide in-stream application information scanning services for system-to-system data sharing capabilities with sensitive information flagging and approval capabilities.

In some examples, the provided methods and apparatuses can advantageously provide in-stream application information scanning services for application-to-application data sharing capabilities with sensitive information flagging and approval capabilities.

In some examples, the provided methods and apparatuses can advantageously provide electronic message flow life cycle management, such as receiving electronic messages, validating electronic messages, transmitting an electronic messages, confirming electronic messages, notifying user devices about electronic messages, or a combination thereof.

In some embodiments, the provided systems and methods can advantageously efficiently and quickly generate at least a portion of an information management machine when compared to conventional techniques.

The provided methods and apparatuses can, among other advantages, improve existing technological processes in the fields of electronics, computer-readable media, and computer engineering. For example, the provided methods and apparatuses particularly improve the technological process of controlling content in an electronic message by utilizing the provided techniques, and thereby provide advantages over conventional techniques.

FIG. 1 depicts an block diagram of a method 100 for automatically controlling of sensitive content of an electronic message, in accordance with an embodiment of the disclosure. The method 100 provides a broad overview of some of the techniques described in further detail herein.

In an embodiment, the method 100 can be implemented in a form of a set of computer-executable instructions. In examples, computer-executable instructions can include artificial intelligence algorithms, trained artificial intelligence models, routines, programs, objects, components, data structures, procedures, operations, modules, functions, or a combination thereof, as non-limiting examples. Such computer-executable instructions can be executed by one or more programmed processors or co-processors, such as those described hereby.

The order in which the method 100 is described is not intended to be construed as a limitation, and any number of the described features can be combined in any order to implement the method 100 or alternate methods for automatically generating and using at least a portion of a machine configured to control sensitive content in an electronic message. Additionally, individual features can be omitted, as is practicable, from the method 100 without departing from the scope of the subject matter described herein. Furthermore, the method 100 can be implemented in any suitable hardware, software, firmware, or a combination thereof, such as the apparatus described hereby.

As shown in FIG. 1, at step 105, one or more of the devices described herein can receive an electronic message to be filtered. In an example, the electronic message to be filtered can be received at a machine 200 of FIG. 2 from a subscribed application 900 of FIG. 9. FIGS. 2-3, 8-9, and 11 describe detailed example steps that can be performed on the received electronic message to be filtered, and in response to receiving the electronic message to be filtered as at least a part of receiving the electronic message to be filtered.

As shown in FIG. 1, at step 110, one or more of the devices described herein can validate the received electronic message. Controlling sensitive content in the received electronic message can include validation. Validation can include searching the received electronic message for a presence of personally identifiable information (PII), protected health information (PHI), sensitive information, or a combination thereof.

In non-limiting examples, PII can include any information that can be used to identify a specific individual, either directly or indirectly. PII can include, and is not limited to, an individual's name, address, social security number, email address, phone number, birthdate, or a combination thereof.

In non-limiting examples, PHI can include any information in the medical record that can be used to identify an individual and was created, used, or disclosed in a course of providing a healthcare service to the individual. PHI can include, and is not limited to, an individual's name, address, medical history, insurance information, pharmacy information, demographic information, financial information, or a combination thereof.

In non-limiting examples, sensitive information can include any information that, if disclosed without authorization, could lead to harm, lead to loss, compromise a user or organization, led to identity theft, lead to financial loss, lead to other adverse consequences, or a combination thereof. In examples, sensitive information can include PII, PHI, critical infrastructure information, export-controlled information, or a combination thereof. In some examples, sensitive information can include Controlled Unclassified Information (CUI). CUI can refer to unclassified information requiring safeguarding, dissemination controls, or both. The safeguarding, dissemination controls, or both can be required by law, regulations, government policy, or a combination thereof. In examples, sensitive information can include information describing critical infrastructure, defense technology, export control technology, finances, immigration, intelligence technology, international agreements, law enforcement, legal information natural resources, cultural resources, nuclear technology, patents, patent applications, privacy, procurement, acquisition, proprietary business information, statistics, taxes, transportation, or a combination thereof.

Figure 2:
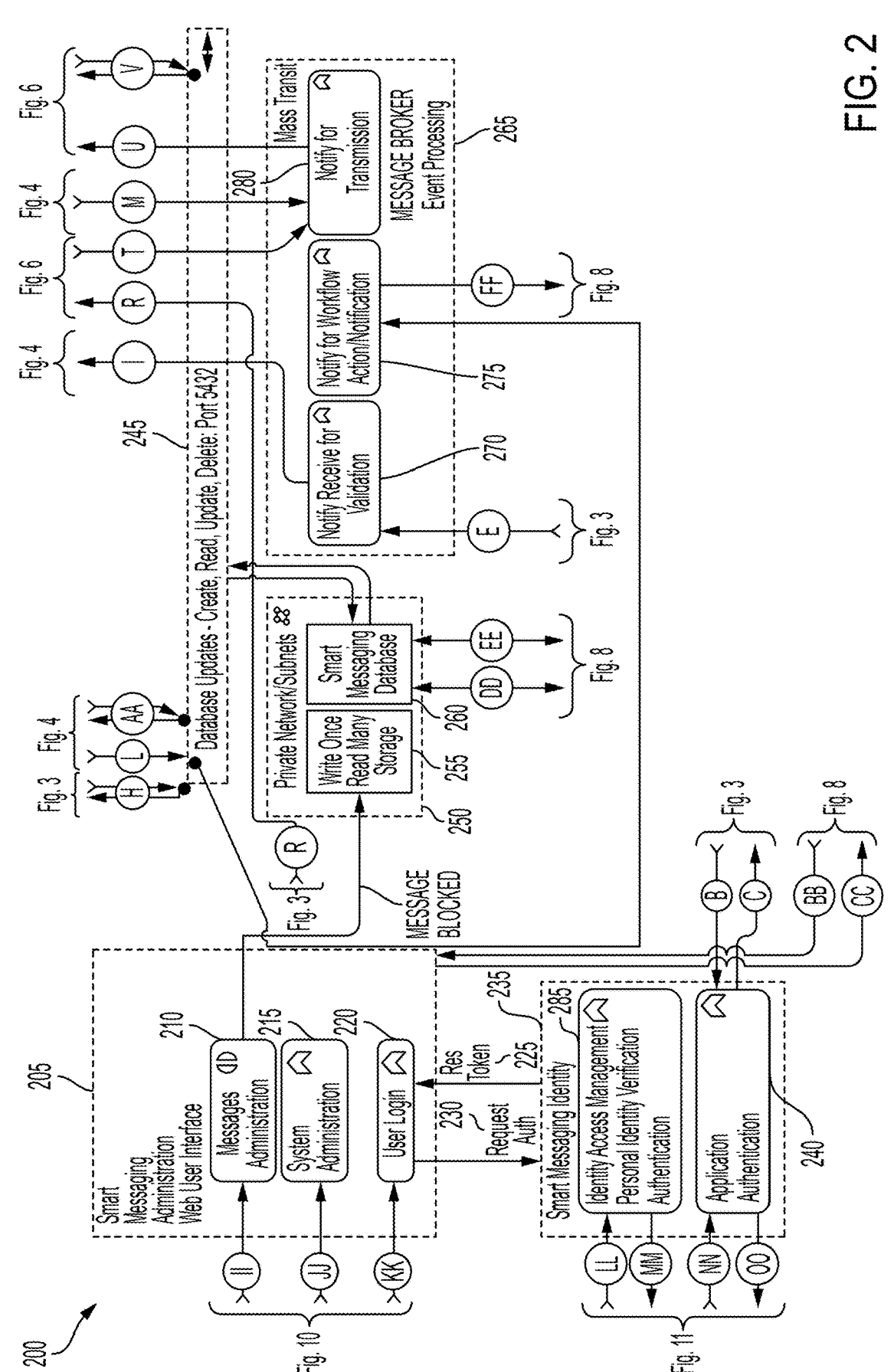
FIG. 2 depicts an administrative portion and a private network portion of a machine configured to control sensitive content in an electronic message suitable for implementing examples of the disclosed subject matter, in accordance with an embodiment of the disclosure.
Figure 4:
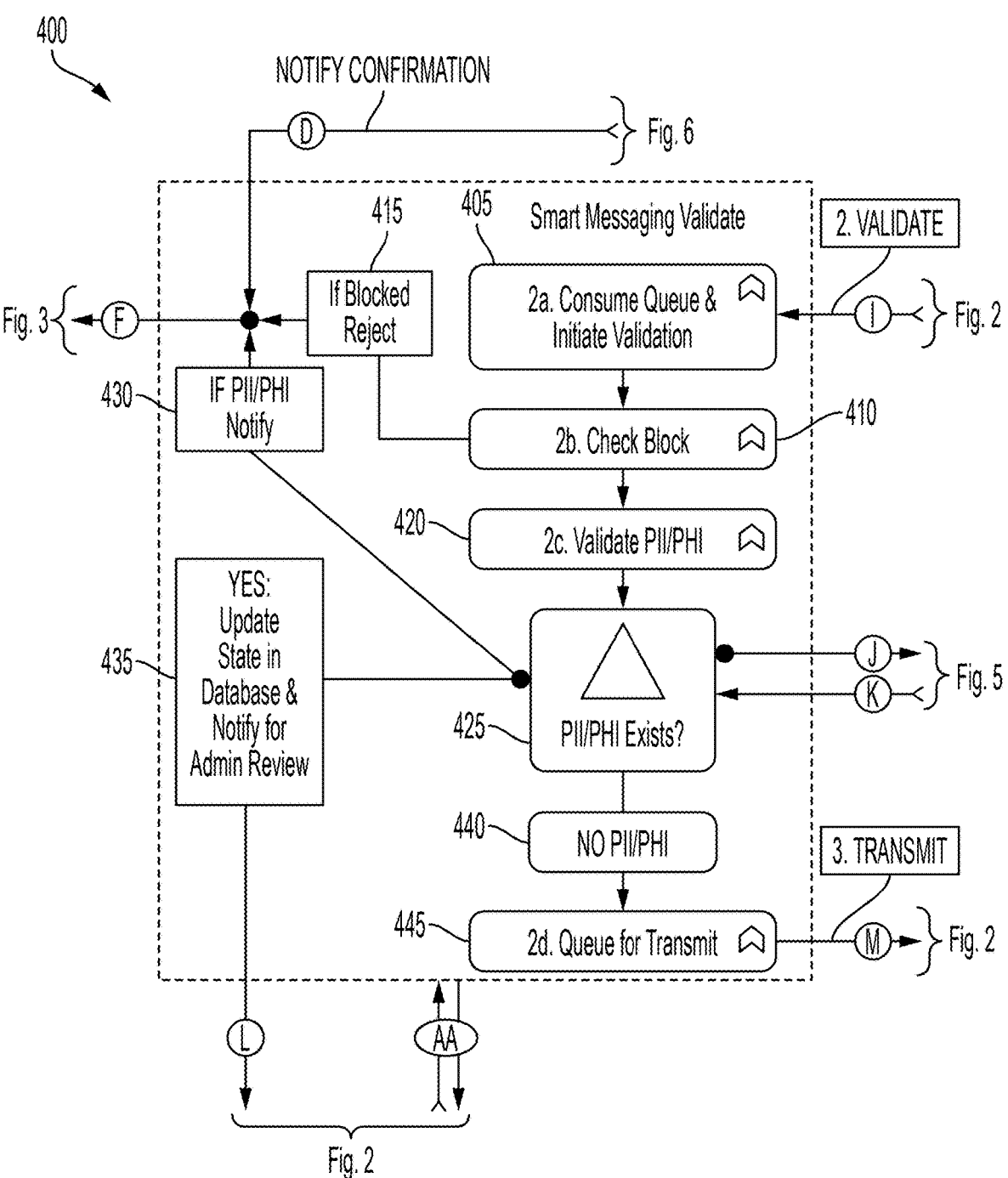
FIG. 4 depicts a secure message validate portion of the machine of FIG. 2, in accordance with an embodiment of the disclosure.
Figure 5:
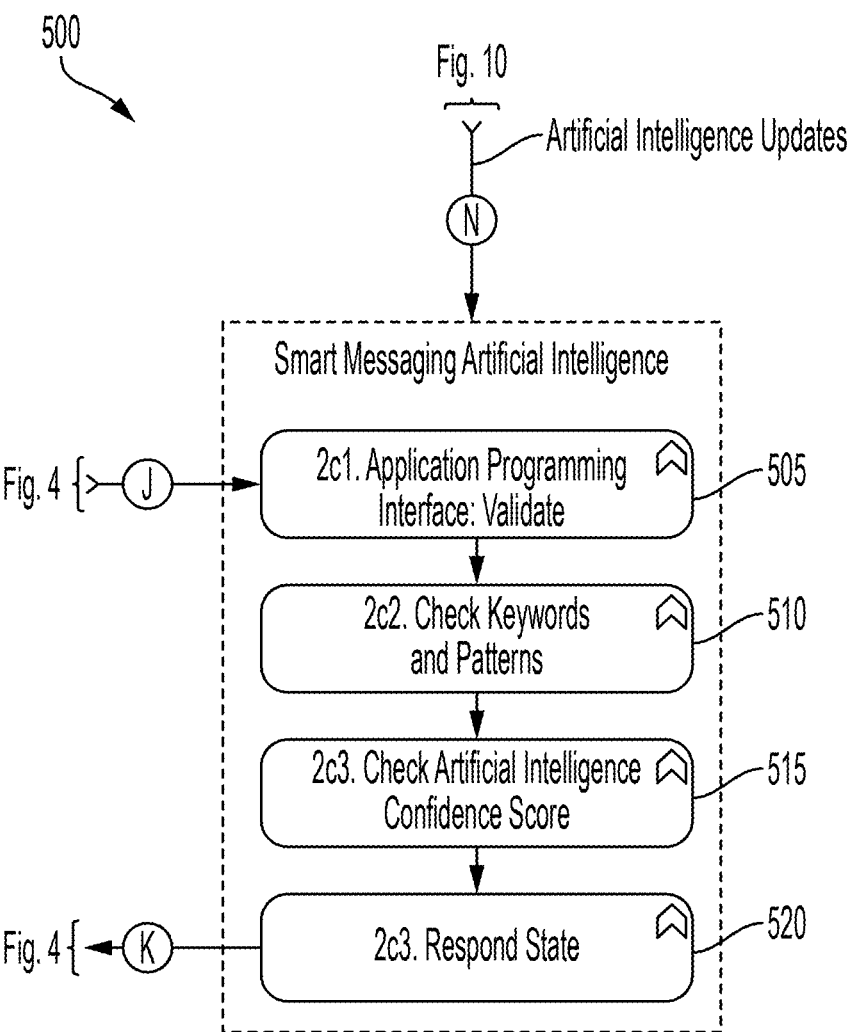
FIG. 5 depicts a smart messaging artificial intelligence portion of the machine of FIG. 2, in accordance with an embodiment of the disclosure.

In examples, the received electronic message can be queued, re-queued, or both, pending validation. Queueing can be performed in response to a backlog of electronic messages to be validated. FIGS. 2 and 4-5 describe detailed example steps that can be performed on the received electronic message to be filtered as at least a part of validating the received electronic message.

As shown in FIG. 1, at step 115, one or more of the devices described herein can transmit the filtered electronic message to a user device. The transmission can occur following controlling of sensitive content in the electronic message. In examples, transmitting the filtered electronic message to a user device can include sending the filtered electronic message from an external private subnet 700 of FIG. 7 to an electronic message service server 1200 of FIG. 12. FIGS. 2, 6-7, and 12 describe detailed example steps that can be performed on the validated electronic message as at least a part of transmitting the filtered electronic message.

As shown in FIG. 1, at step 120, one or more of the devices described herein can verify delivery of the transmitted electronic message. In examples, verifying delivery of the transmitted electronic message can include the external private subnet 700 of FIG. 7 receiving a delivery receipt from the electronic message service server 1200 of FIG. 12.

Figure 7:
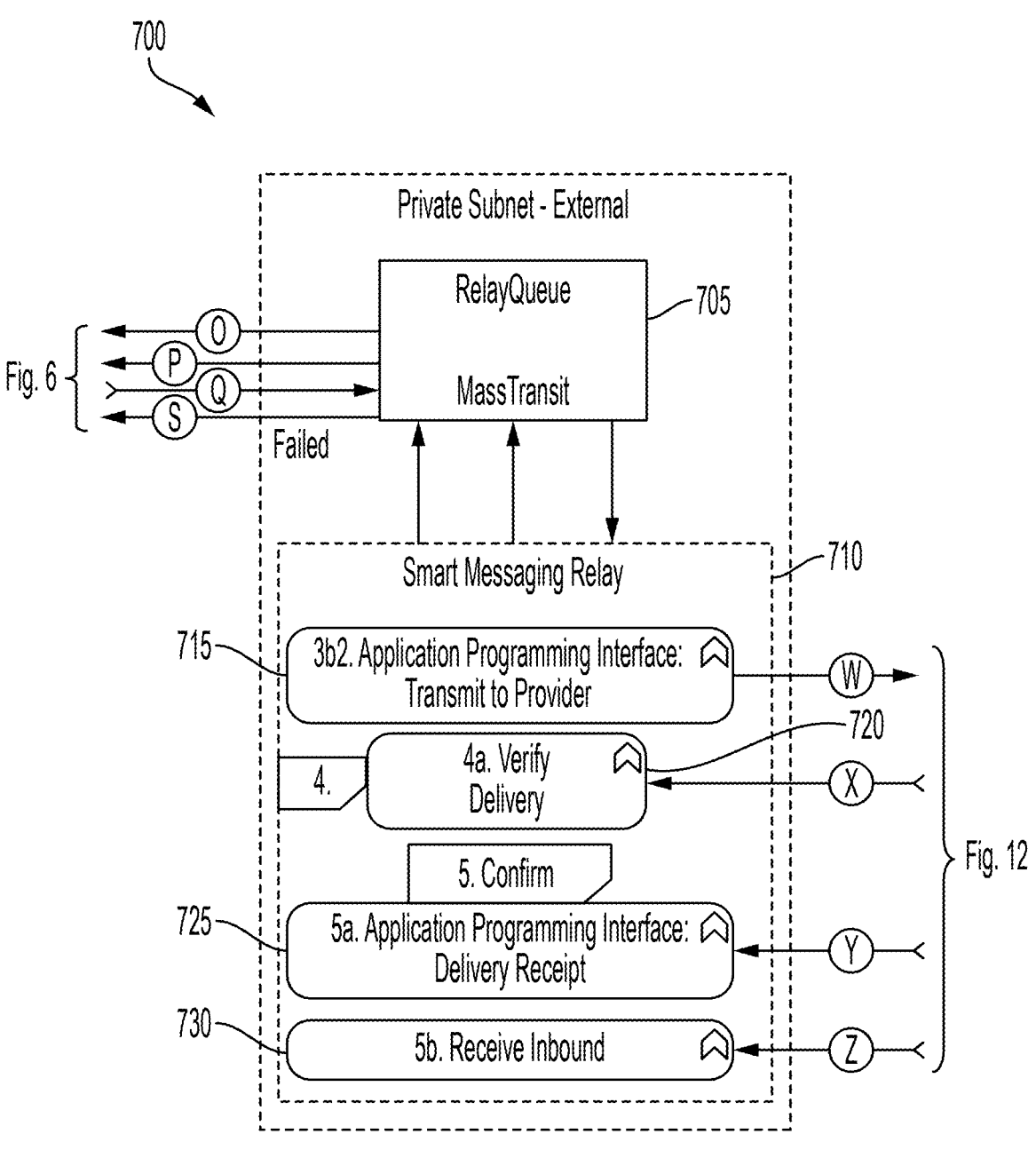
FIG. 7 depicts a private subnet portion of the machine of FIG. 2, in accordance with an embodiment of the disclosure.
Figure 12:
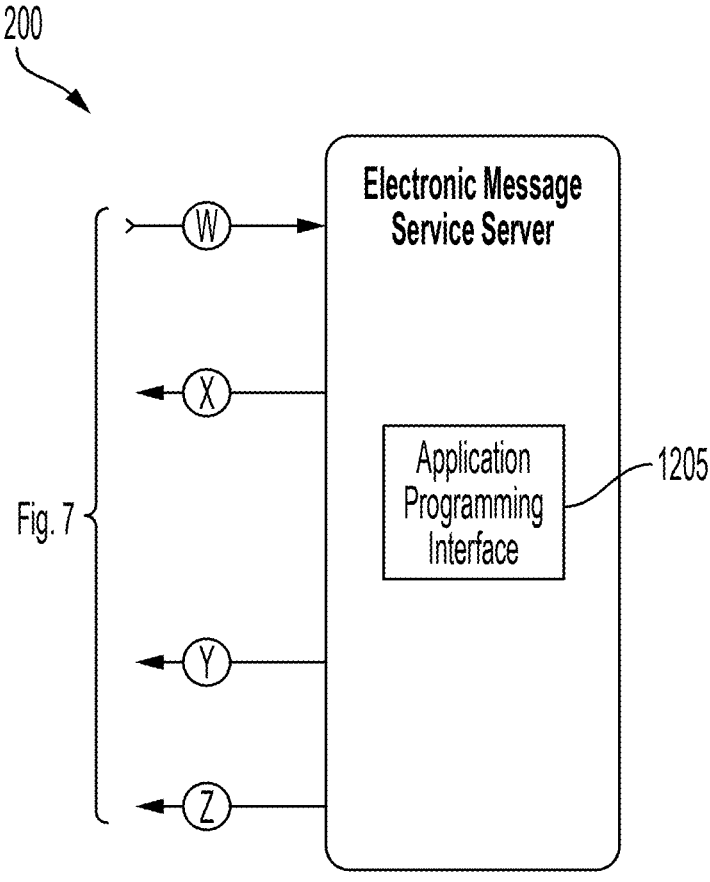
FIG. 12 depicts an electronic message service machine, in accordance with an embodiment of the disclosure.

In examples, when transmission of the transmitted electronic message fails, the transmitted electronic message can be queued, re-queued, or both, pending retransmission. The transmitted electronic message can then be retransmitted at least once to further attempt delivery. FIGS. 7 and 12 describe detailed example steps that can be performed on the transmitted electronic message as at least a part of verifying delivery of the transmitted electronic message.

As shown in FIG. 1, at step 125, one or more of the devices described herein can confirm the electronic message was delivered to the user device. Delivery confirmation can include sending a delivery receipt to a user device from which the electronic message originated. Delivery confirmation can include sending a delivery receipt to a subscribed application 900 in FIG. 9. In examples, verifying delivery of the electronic message to the user device can initiate confirming delivery of the delivered electronic message. FIGS. 3, 6-7, 9, and 12 describe detailed example steps that can be performed on the transmitted electronic message as at least a part of confirming delivery of the transmitted electronic message.

We now turn to FIGS. 2-8.

FIGS. 2-8 depict respective portions of a machine 200 that filters content of an electronic message, suitable for implementing examples of the disclosed subject matter.

Figure 14:
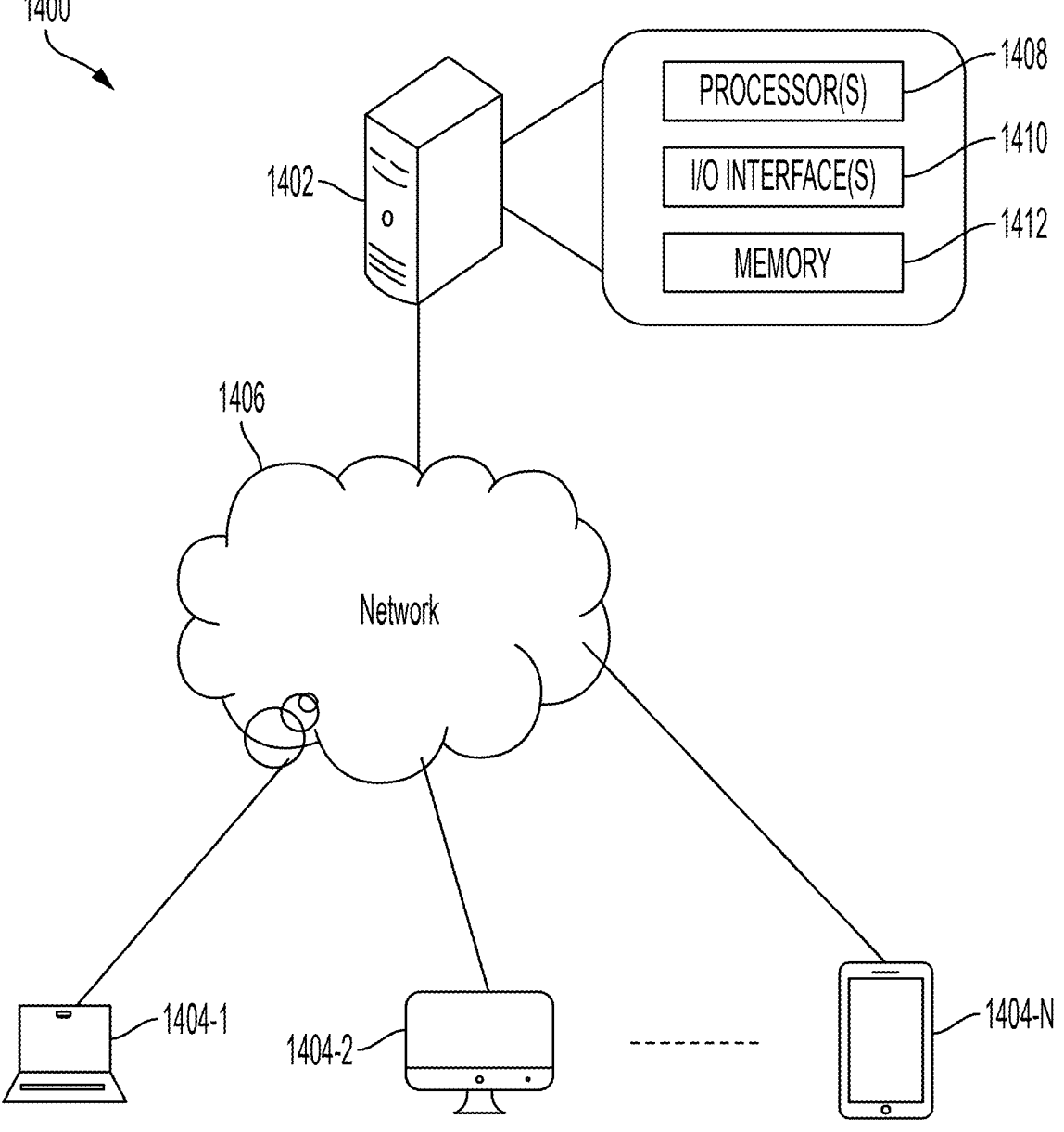
FIG. 14 depicts an example network implementation of a system suitable for implementing examples of the disclosed subject matter.
Figure 15:
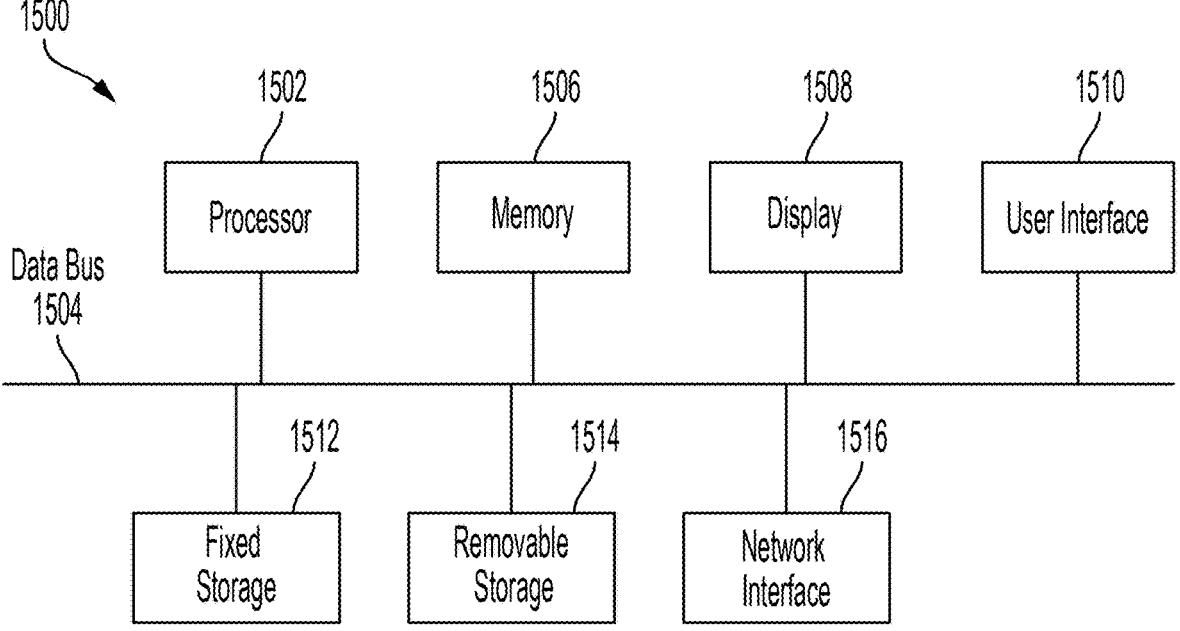
FIG. 15 depicts an example diagram of an example computing device suitable for implementing examples of the disclosed subject matter.

FIG. 2 depicts portions of the machine 200 that can be at least a portion of a computing device, such as the computing device 1500 of FIG. 15. The portions of the machine 200 can be at least a part of, or coupled to the network implementation 1400 of FIG. 14.

The machine 200 can provide a smart messaging administration web user interface 205. The smart messaging administration web user interface 205 can be configured to perform message administration 210. The message administration 210 can track a status of the electronic message as the electronic message is processed by the machine 200. The message administration 210 can receive instructions from a personas machine, such as an administrator user device, describing whether or not the electronic message being filtered is permitted to be transmitted to a user device. The message administration step 210 can in turn send a "message blocked" instruction or a transmit message instruction to at least another portion of the machine 200.

The smart messaging administration web user interface 205 can be configured to perform system administration 215. The system administration 215 can manage and maintain the system 200, including computing devices of the machine 200, networks internal to the machine 200, external to the machine 200, related infrastructure, or a combination thereof.

The smart messaging administration web user interface 205 can also be configured to perform user login security 220. The user login security 220 can perform token-based identification, where users are granted a unique access token (e.g. res token 225) after successful initial authentication. The user login security 220 can enable the user's initial login, token generation for the user, transmitting the token to the user's device, token validation, as well as granting or denying access based on the tokens validity. The user login security 220 can provide the machine 200 with a single sign-on system that can enable a user to access multiple features of the machine 200 after a single login. The user login security 220 can also provide scalability and multi-factor authentication. An example, the user login security 220 can send an authorization request 230 from a smart messaging identity portion 235 of the machine 200.

The smart messaging identity portion 235 of the machine 200 can be configured to perform an identity access management (IAM) personal identity verification (PIV) authentication function 285. The IAM PIV authentication function 285 can provide a security framework the controls user access and user device access to at least a portion of the machine 200. The IAM PIV authentication function 285 can also prevent unauthorized access to at least a portion of the machine 200. In examples, the IAM PIV authentication function 285 can provide secure multifactor authentication the verifying identity of user attempting access the machine 200.

In examples, the smart messaging identity portion 235 can receive the authorization request 230 from the smart messaging identity portion 235, authenticate a user, user device, or both in response to the authorization request 230, and subsequently generate the res token 225 in response to the authentication. The smart messaging identity portion 235 can transmit the res token 225 to the user login security 220.

In examples, the smart messaging identity portion 235 can include application authentication 240. The application authentication 240 can verify an identity of an application, such as a subscribed application, to ensure the application is what it claims to be, prior to granting the application access to the machine 200. Verifying the identity of the application can also be a prerequisite to the machine 200 performing controlling of sensitive content in the electronic message received from the application.

In examples, the machine 200 can also include a database 245. The database 245 can store at least a portion of the digital information described herein. In examples, the database 245 can be configured to enable the user, user device, or both to create at least a portion of the database 245, read at least a portion of the database 245, update at least a portion of the database 245, or a combination thereof.

In examples, the machine 200 can also include a private network 250.

The private network 250 can include right once read many storage 255.

The private network 250 can include a smart messaging database 260. The smart messaging database 260 can provide digital information storage of at least a portion of the dual information described herein. In examples, the smart messaging database 260 can be configured to enable an administrator, administrator device, or both to create at least a portion of the smart messaging database 260, read at least a portion of the smart messaging database 260, update at least a portion of the smart messaging database 260, delete at least a portion of the smart messaging database 260, or a combination thereof.

In examples, the machine 200 can also include a message broker event processing portion 265. The message broker event processing portion 265 can manage a sickness exchange of events between different portions of the machine 200, thus enabling communication between the portions of the machine 200 without direct dependencies, which in turn enables flexible and scalable architecture of the machine 200.

In examples, the message broker event processing portion 265 can include a notify received for validation function 270. The notify received for validation function 270 can receive an indication that the electronic message to be filtered has been received and queued for validation by a secure message validate portion 400 in FIG. 4.

In examples, the message broker event processing portion 265 can include a notify for workflow action and notification function 275. The notify for workflow action and notification function 275 can manage workflow of functions to be performed by the machine 200 on at least one electronic message that includes PII, PHI, sensitive information, or a combination thereof. The notify for workflow action and notification function 275 can organize, automate, and optimize a series of functions that relate to the at least one electronic message that includes PII, PHI, sensitive information, or the combination thereof. Thus the notify for workflow action and notification function 275 can advantageously automate workflows of the machine 200 so the machine 200 operates in an efficient manner that has a reduced number of errors, when compared to conventional techniques.

In examples, the message broker event processing portion 265 can include a notify for transmission function 280. The notify for transmission function 280 can manage a transmit queue of filtered electronic messages to be transmitted. In examples, the notify for transmission function 280 can instruct a secure message queue processor portion 600 in FIG. 6 to initiate transmitting a specific electronic message to be transmitted.

Figure 3:
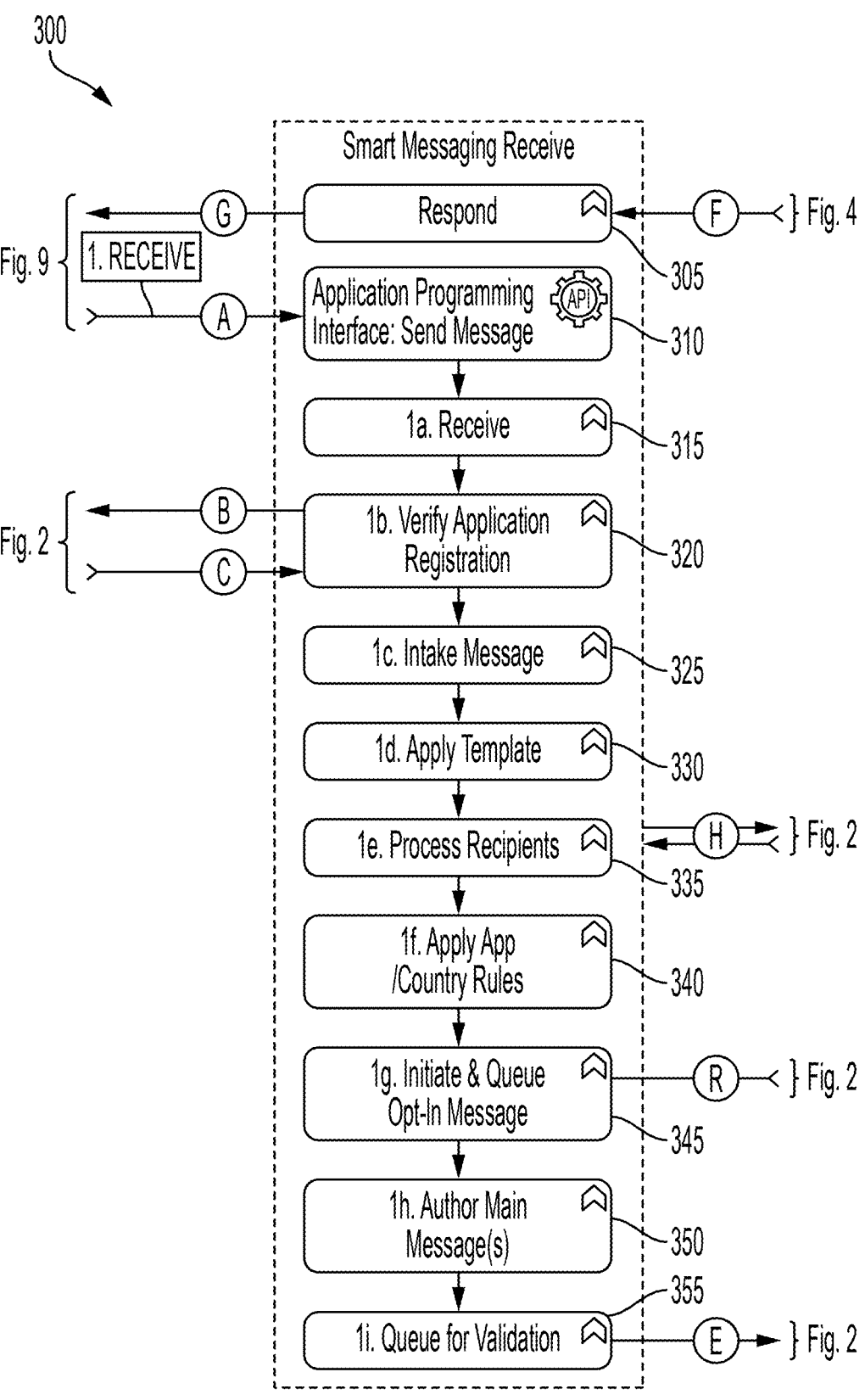
FIG. 3 depicts a secure message receive portion of the machine of FIG. 2, in accordance with an embodiment of the disclosure.

We now turn to FIG. 3.

FIG. 3 depicts a secure message receive portion 300 of the machine 200 of FIG. 2, in accordance with an embodiment of the disclosure. In examples, the secure message receive portion 300 can be at least a portion of a computing device, such as the computing device 1500 of FIG. 15. The secure message receive portion 300 can be at least a part of, or coupled to the network implementation 1400 of FIG. 14.

In examples, the secure message receive portion 300 can include a respond function 305. In examples, the respond function 305 can receive a delivery confirmation notice and forward the delivery confirmation notice to a subscribed application.

In examples, the secure message receive portion 300 can include a send message application programming interface 310. The send message application programming interface 310 enables receipt of electronic message to be filtered from a subscribed application. The send message application programming interface 310 can provide a defined interface that enables a subscribed application to interact with at least a portion of the machine 200. The send message application programming interface 310 can also enable communication and data exchange between the machine 200 and the subscribed application, thus enabling multitenancy.

In examples, the secure message receive portion 300 can include a receive function 315.

In examples, the secure message receive portion 300 can include a verifying application registration function 320. In examples, the verifying application registration function 320 can initiate verifying that an application is registered, for example in response to the machine 200 receiving and electronic message to be filtered from an application whose registration is not presently verified. Initiating the verification can include sending a message to the IAM PIV authentication function 285, where the message includes information describing an aspect of the application whose registration is not presently verified. The verifying application registration function 320 can also receive a message from the IAM PIV authentication function 285 verifying the application is registered or identifying that the application is not registered. In examples, controlling of sensitive content in an electronic message will not be performed when an electronic message is received from an unregistered application.

In examples, the secure message receive portion 300 can include an intake message function 325.

In examples, the secure message receive portion 300 can include an apply template function 330.

In examples, the secure message receive portion 300 can include a process recipients function 335. Example, the process recipients function 335 can access the database 245 to store recipient information, store the electronic message be filtered, retrieve recipient information, retrieve the electronic message to be filtered, or a combination thereof.

In examples, the secure message receive portion 300 can include an apply application and country rules function 340.

In examples, the secure message receive portion 300 can include an initiate and queue opt-in message function 345.

In examples, the secure message receive portion 300 can include an author main message(s) function 350.

In examples, the secure message receive portion 300 can include a queue for validation function 355. In examples, the queue for validation function 355 can queue the electric message to be filtered and sent a message to the notify received for validation function 270 that the electronic message to be filtered has been received and queued for validation by the secure message validate portion 400 in FIG. 4.

We now turn to FIG. 4.

FIG. 4 depicts a secure message validate portion 400 of the machine 200 of FIG. 2, in accordance with an embodiment of the disclosure. In examples, the secure message validate portion 400 can be at least a portion of a computing device, such as the computing device 1500 of FIG. 15. The secure message validate portion 400 can be at least a part of, or coupled to the network implementation 1400 of FIG. 14. In examples, as part of performing the functions therein, the secure message validate portion 400 can read and write information to the database 245.

The secure message validate portion 400 can include a consume queue in initiate validation function 405.

The secure message validate portion 400 can include a check block function 410. If the check block function 410 yields that the message to be filtered is to be blocked, the check block function 410 can send a message indicating the electronic message be filtered is blocked and rejected 415.

The secure message validate portion 400 can include a validate function 420.

The secure message validate portion 400 can include a validation function 425. In examples the validation function 425 can search the electronic message to be filtered for PII, PHI, sensitive information, or a combination thereof. Validation function 425 can communicate with, and use the functions of, the smart messaging artificial intelligence portion 500 of FIG. 5 to perform validation using artificial intelligence techniques.

The validation function 425 can generate messages to be sent to other portions of the machine 200. For example, the validation function 425 can generate a message, such as a notification message 430, indicating that PII, PHI, sensitive information, or the combination thereof is present in the filtered electronic message. The validation function 425 can also send an update and notification message 435 indicating that a state in the database 245 is to be updated. The state in the database 245 can indicate the filtered electronic message includes PII, PHI, sensitive information, or the combination thereof. The validation function 425 can also send an update and notification message 435 to the administrator user device indicating that administrator review is necessary in response to the indicated presence of PII, PHI, sensitive information, or the combination thereof in the filtered electronic message.

In an example, the validation function 425 can generate a message 440 indicating that PII, PHI, sensitive information, or the combination thereof is not present in the filtered electronic message. In an absence of PII, PHI, and sensitive information, a queue for transmit portion 445 queues the filtered electronic message transmission and sends a message to the notify for transmission function 280 indicating the filtered electronic message is ready to be transmitted and in the queue.

We now turn to FIG. 5.

FIG. 5 depicts a smart messaging artificial intelligence portion 500 of the machine 200 of FIG. 2, in accordance with an embodiment of the disclosure. The smart messaging artificial intelligence portion 500 can control sensitive content in an electronic message. In examples, the smart messaging artificial intelligence portion 500 can perform at least a portion of an example method 1300 of FIG. 13, other controlling of sensitive content techniques described herein, or a combination thereof.

In examples, the smart messaging artificial intelligence portion 500 can be at least a portion of a computing device, such as the computing device 1500 of FIG. 15. The smart messaging artificial intelligence portion 500 can be at least a part of, or coupled to the network implementation 1400 of FIG. 14.

In some examples, the machine 200 can use an artificial intelligence algorithm to collect information, to process information, or both. For example, the smart messaging artificial intelligence portion 500 of the machine 200 can collect information, process information, or both. Using the artificial intelligence algorithm can include performing a neural network convolution on information being evaluated by the artificial intelligence algorithm. The neural network convolution can be performed automatically using electronic processor.

In examples, the artificial intelligence algorithm can be logically separated from a public-facing network. This technique enhances security and data protection of the information in the electronic message to be filtered, when compared to conventional techniques. This technique also ensures that artificial intelligence models and the information processed by those artificial intelligence models remain within a controlled and secure environment to lower (or removal) risk of disclosure. In some examples, all artificial intelligence model execution is performed within the smart messaging artificial intelligence portion 500. In some examples, all artificial intelligence model execution is performed within the machine 200. In some examples, the logical separation of the artificial intelligence algorithm can take the form of an "air-gapped artificial intelligence."

In some examples, the artificial intelligence algorithm can be trained with training information configured to cause the artificial intelligence algorithm to be configured to perform at least one function, step, feature, block, or a combination thereof, as described herein. In some examples, the methods and functions described herein can include training the artificial intelligence algorithm with training information configured to cause artificial intelligence algorithm to be configured to perform at least one function, step, feature, block, or a combination thereof, as described hereby. In some examples, the artificial intelligence algorithm can be trained with training information configured to cause the artificial intelligence algorithm to be configured to perform at least a portion of controlling of sensitive content in an electronic message. In some examples, the artificial intelligence algorithm training can be improved upon at least in part based on results of previous controlling of sensitive content in of electronic messages. The training the machine-learning classifier can also include preparing an artificial intelligence training dataset from results of previous controlling of sensitive content in electronic messages.

In examples, the artificial intelligence algorithm can be continuously trained. In other examples the artificial intelligence algorithm can be periodically trained.

In examples, the smart messaging artificial intelligence portion 500 can include a validation application programming interface 505. The validation application programming interface 505 can be configured to communicate with the validation function 425. The validation function 425 can send, to the validation application programming interface 505, information describing the electronic message to be filtered. The validation application programming interface 505 can receive, from the validation function 425, the information describing the electronic message to be filtered.

In examples, the information describing the electronic message to be filtered can include electronic message to be filtered.

In examples, the smart messaging artificial intelligence portion 500 can include a check keywords and patterns function 510. The check keywords and patterns function 510 can identify a presence of a pattern in the body of the electronic message being filtered, a presence of a keyword in the body of the electronic message being filtered, or both.

In examples, the check keywords and patterns function 510 can identify a pattern match by applying an expression pattern matching algorithm to a body of the electronic message. The pattern match can (i) identify a presence of a pattern in the body of the electronic message, a presence of a keyword in the body of the electronic message, or both, (ii) indicate a presence of sensitive information in the body of the electronic message, or (iii) both.

In examples, the smart messaging artificial intelligence portion 500 can include a check artificial intelligence confidence score function 515. The check artificial intelligence confidence score function 515 can (i) generate a quantitative score indicating a validity of sensitive information in a pattern match by using an artificial intelligence algorithm configured with a sensitive information entity model to analyze the pattern match, (ii) determine, by applying a confidence calculator to the pattern match, a confidence score based on proximate content in the body of the electronic message, where the proximate content is proximate to the pattern in the body of the electronic message, the keyword in the body of the electronic message, or both, and (iii) produce a final score by applying an algorithm to the quantitative score and the confidence score, or a combination thereof. In non-limiting examples, the algorithm can be a Boolean algorithm.

In examples, the smart messaging artificial intelligence portion 500 can include a respond state function 520. The respond state function 520 can be configured to communicate with the validation function 425. The respond state function 520 can send, to the validation function 425, information describing results of controlling of sensitive content in the electronic message. In examples, the response state function 520 can send, when the final score indicates PII, PHI, sensitive information, or both is present in the electronic message, a request for review to an administrator user device. The request for review can include a copy of the electronic message, the final score, or both. The final score can indicate a presence or an absence of PII, PHI, sensitive information, or a combination thereof in the body of the electronic message being filtered. The final score can be used (i) as an input for a subsequent service, (ii) as subject matter to be reviewed by an administrator using an administrator user device to make a data driven decision regarding the presence of PII, PHI, sensitive information, or a combination thereof in the body of the electronic message being filtered, (iii) as new training data for an artificial intelligence algorithm described herein, or (iv) a combination thereof.

Figure 6:
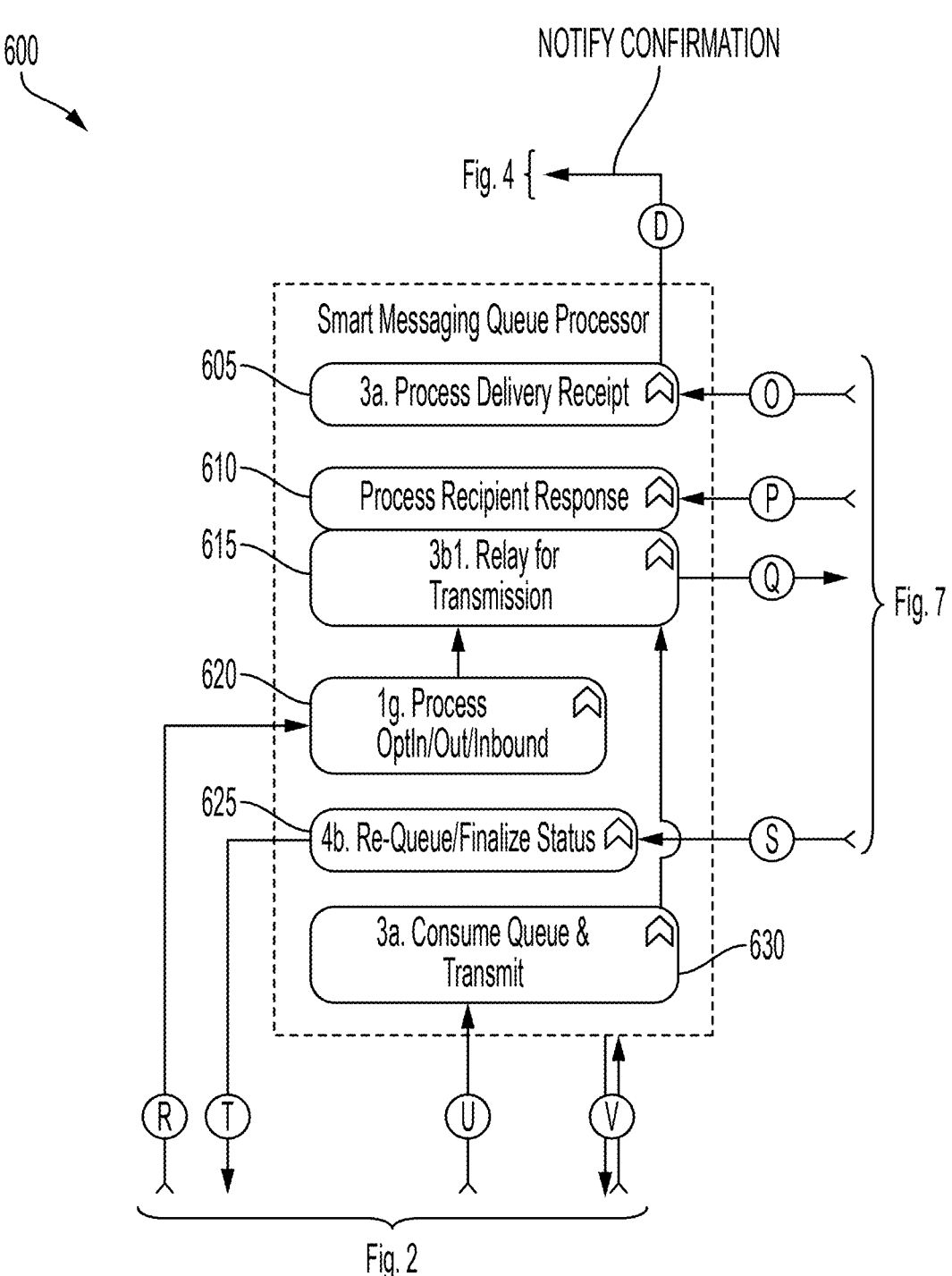
FIG. 6 depicts a secure message queue processor portion of the machine of FIG. 2, in accordance with an embodiment of the disclosure.

We now turn to FIG. 6.

FIG. 6 depicts a secure message queue processor portion 600 of the machine 200 of FIG. 2, in accordance with an embodiment of the disclosure. In examples, the secure message queue processor portion 600 can be at least a portion of a computing device, such as the computing device 1500 of FIG. 15. The secure message queue processor portion 600 can be at least a part of, or coupled to the network implementation 1400 of FIG. 14. In an example, only the secure message queue processor portion 600 can communicate with the relay queue 705 of FIG. 7, to prevent backward penetration into portions of the machine 200 from external networks.

In an example, the secure message queue processor portion 600 can include a delivery receipt processing function 605. The delivery receipt processing function 605 can manage queueing of a delivery confirmation notice received from the electronic message service machine 1200 of FIG. 12. In response to receiving the delivery confirmation notice, the delivery receipt processing function 605 can send a notify confirmation message to the respond function 305.

In an example, the secure message queue processor portion 600 can include a recipient response processing function 610. The recipient response processing function 610 can manage queueing of a recipient response message received from the electronic message service machine 1200 of FIG. 12.

In an example, the secure message queue processor portion 600 can include a relay for transmission function 615. The relay for transmission function 615 can relay the filtered electronic message to be transmitted from a consume queue and transmit function 630 to the relay queue 705.

In an example, the secure message queue processor portion 600 can include an opt in, opt out, and inbound function 620.

In an example, the secure message queue processor portion 600 can include a re-queue and finalize status function 625. The re-queue and finalize status function 625 can trigger, in response to receiving a message delivery failure message from the relay queue 705, the transmission function 615 to re-relay the filtered electronic message to be transmitted from the consume queue and transmit function 630 to the relay queue 705.

We now turn to FIG. 7.

FIG. 7 depicts a private subnet portion 700 of the machine 200 of FIG. 2, in accordance with an embodiment of the disclosure. In examples, the private subnet portion 700 can be at least a portion of a computing device, such as the computing device 1500 of FIG. 15. The private subnet portion 700 can be at least a part of, or coupled to the network implementation 1400 of FIG. 14.

In examples, the private subnet portion 700 can include a relay queue 705. The relay queue 705 can queue messages be transmitted, delivery receipts, delivery confirmation messages, inbound messages received from the electronic message service machine 1200 of FIG. 12, or a combination thereof.

In examples, the private subnet portion 700 can include a smart messaging relay function 710. The smart messaging relay function 710 can include a transmit to provider application programming interface 715. The transmit to provider application programming interface 715 can enable the machine 200 to communicate with an electronic message service machine 1200 of FIG. 12. In examples the transmit to provider application programming interface 715 can send, to the electronic message service machine 1200, the electronic message to be transmitted.

In examples, the smart messaging relay function 710 can include a verified delivery function 720. The verified delivery function 720 can receive, from the electronic message service machine 1200, a delivery verification message indicating that the transmitted electronic message has been delivered to a user device to which the electronic message is addressed. In response to receiving the delivery verification message, the verified delivery function 720 can initiate sending a notify confirmation message from the machine 200 to the subscribed application 900.

In examples, the smart messaging relay portion 710 can include a delivery receipt application programming interface 725. The delivery receipt application programming interface 725 can enable the machine 200 to communicate with the electronic message service machine 1200. The delivery receipt application programming interface 725 can receive, from the electronic message service machine 1200, a delivery receipt message indicating the filtered and transmitted electronic message was received by the user device.

In examples, the smart messaging relay function 710 can include a receive inbound function 730. The receive inbound function 730 can receive, from the electronic message service machine 1200 and inbound electronic message. In an example, the inbound electronic message can be sent by a user device that received the filtered and transmitted electronic message in response to receiving the filtered and transmit electronic message. The receive inbound function 730 can then forward the inbound electronic message to the subscribed application 900.

Figure 8:
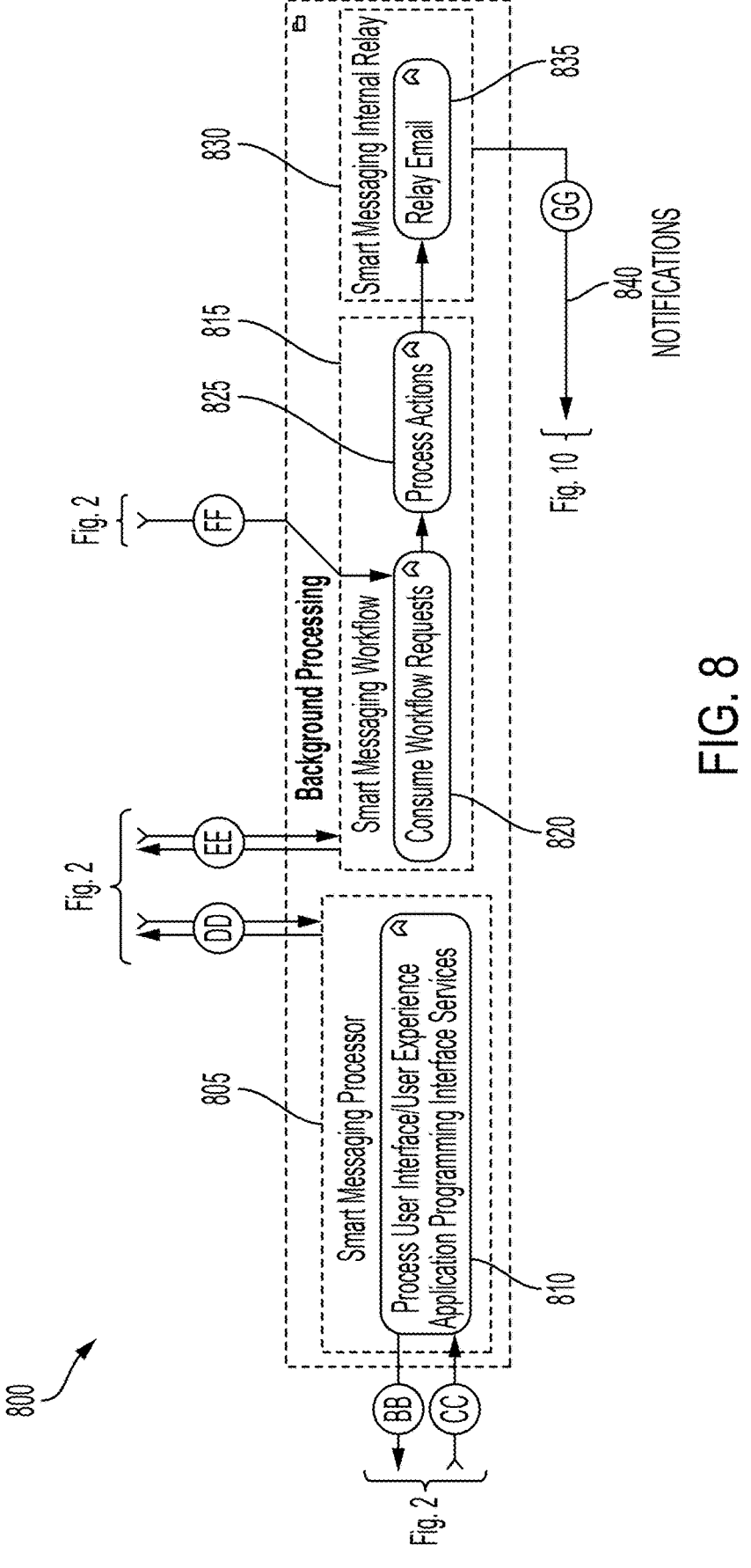
FIG. 8 depicts a background processing portion of the machine of FIG. 2, in accordance with an embodiment of the disclosure.

We now turn to FIG. 8.

FIG. 8 depicts a background processing portion 800 of the machine 200 of FIG. 2, in accordance with an embodiment of the disclosure. In examples, the background processing portion 800 can be at least a portion of a computing device, such as the computing device 1500 of FIG. 15. The background processing portion 800 can be at least a part of, or coupled to the network implementation 1400 of FIG. 14.

In an example, the background processing portion 800 can include a smart messaging processor 805. The smart messaging processor 805 can perform at least a portion of a method described herein. In some examples, the smart messaging processor 805 can include a process user interface/user experience application programming interface services function 810. The process user interface/user experience application programming interface services function 810 can receive, process, and send information relating to user interfaces described herein, user logins described herein, the smart messaging administration web user interface 205, or a combination thereof.

In some examples, the background processing portion 800 can include a smart messaging workflow function 815. The smart messaging workflow function 815 can define, analyze, organize, optimize, and automate workflows of and relating to the machine 200.

The smart messaging workflow function 815 can include a consume workflow requests function 820, a process actions function 825, or both. The consume workflow requests function 820 can receive workflow requests of and relating to the machine 200. The process actions function 825 can process workflow requests relating to the machine 200.

Examples, the background processing portion 800 can include a smart messaging internal relay function 830 that can include a relay email function 835. The relay email function 835 can generate and send notifications 840. In a nonlimiting example, the notifications 840 can be in the form of an email.

Figure 9:
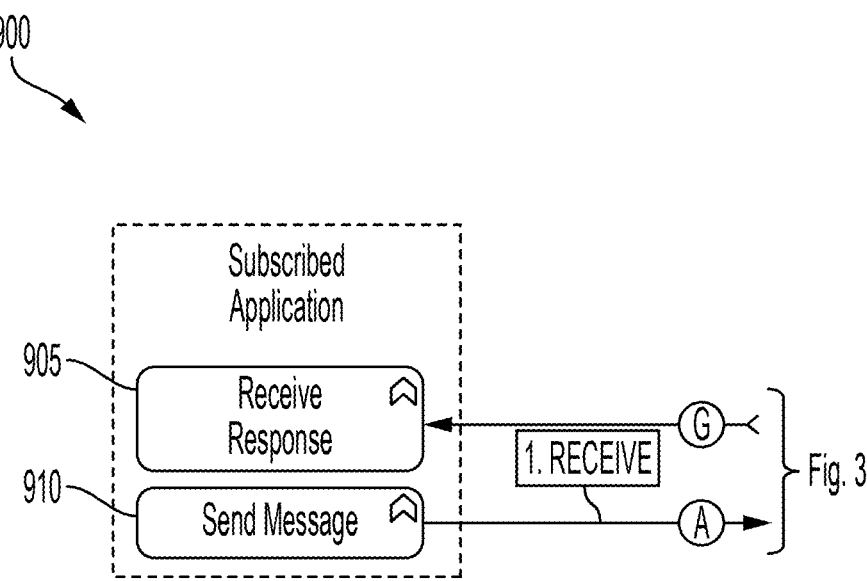
FIG. 9 depicts a subscribed application machine, in accordance with an embodiment of the disclosure.

We now turn to FIG. 9.

FIG. 9 depicts a subscribed application machine 900, in accordance with an embodiment of the disclosure. In examples, the subscribed application machine 900 can be a device configured to prepare electronic message to be filtered by machine 200. The subscribed application machine 900 can be a computing device implementing an application that is permitted to access at least a portion of the machine 200, use at least a portion of a method implemented by the machine 200, initiate performance of at least a portion of a method performed by the machine 200, benefit from at least a portion of a method implemented by the machine 200, or a combination thereof.

In examples, the subscribed application machine 900 can be configured to receive 905 an electronic response message. Receiving the electronic response message can be a portion of the confirm step 125. Electronic response messages are described herein in further detail with reference to FIG. 12.

In some embodiments, the subscribed application machine 900 can be configured to send 910 an electronic message to be filtered by the machine 200. Subsequently receiving the electronic message by the machine 200 can be at least a portion of the receive step 105.

Figure 10:
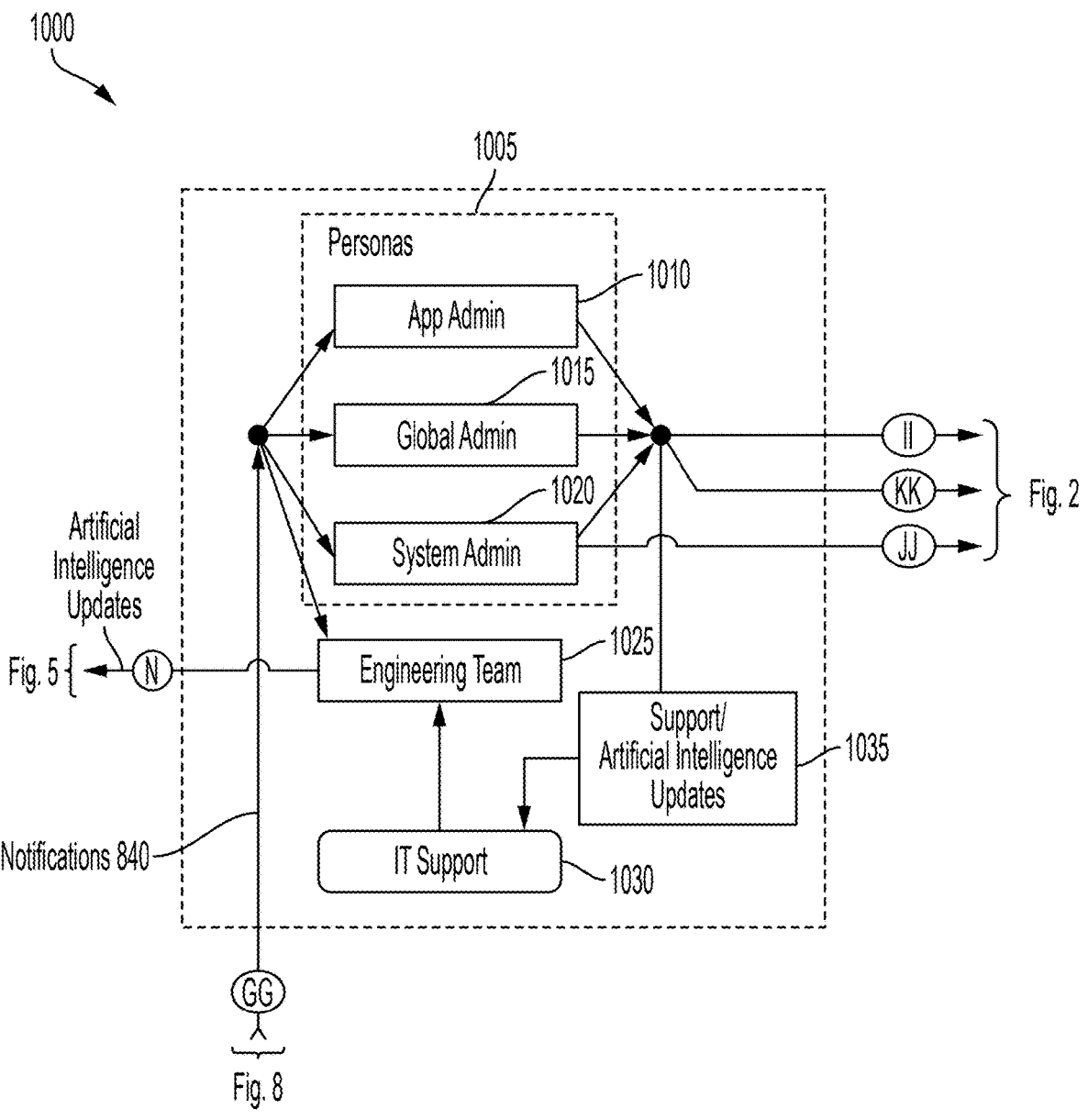
FIG. 10 depicts a personas machine, in accordance with an embodiment of the disclosure.

We now turn to FIG. 10.

FIG. 10 depicts a personas machine 1000, in accordance with an embodiment of the disclosure. The personas machine 1000 can include at least one user device that is coupled to the machine 200 and configured to perform an administrative function, engineering function, support function, or a combination thereof.

In an example, the personas machine 1000 can include a user device configured to perform functions of an application administrator 1010 in response to user input. The user device configured to perform functions of an application administrator 1010 can be configured to receive the notifications 840 from the background processing portion 800, and to send instructions to constituent portions of the smart messaging administration web user interface 205.

In an example, the personas machine 1000 can include a user device configured to perform functions of a global administrator 1015 in response to user input. The user device configured to perform functions of a global administrator 1015 can be configured to receive the notifications 840 from the background processing portion 800, and to send instructions to constituent portions of the smart messaging administration web user interface 205.

In an example, the personas machine 1000 can include a user device configured to perform functions of a system administrator 1020 in response to user input. The user device configured to perform functions of a system administrator 1020 can be configured to receive the notifications 840 from the background processing portion 800, and to send instructions to constituent portions of the smart messaging administration web user interface 205.

In an example, the personas machine 1000 can include a user device configured to perform functions of an engineering support user 1025 in response to user input. The user device configured to perform functions of an engineering support user 1025 can be configured to receive the notifications 840 from the background processing portion 800.

In an example, the personas machine 1000 can include a user device configured to perform functions of an information technology support user 1030 in response user input. This user device can be configured to receive support and artificial intelligence updates 1035 from other user devices in the personas machine 1000.

Figure 11:
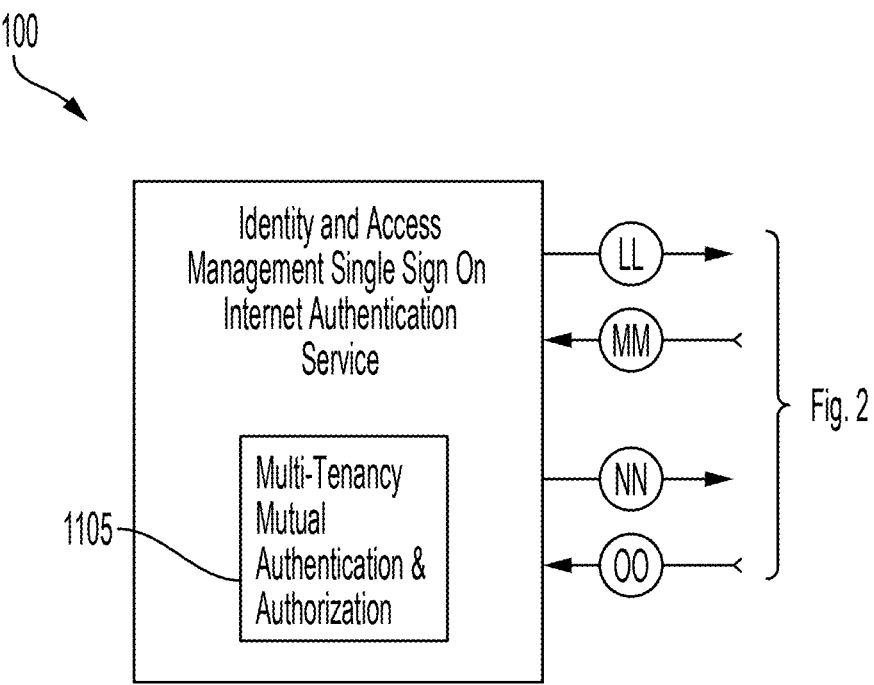
FIG. 11 depicts an identity and access management machine, in accordance with an embodiment of the disclosure.

We now turn to FIG. 11.

FIG. 11 depicts an identity and access management machine 1100 (IAM), in accordance with an embodiment of the disclosure. In examples, IAM machine 1100 can be configured to perform an identity and access management single sign-on (SSO) Internet authentication service 1105. The IAM machine 1100 can be configured to authenticate users attempting to access the machine 200; authenticate electronic devices attempting to access the machine 200;

determine which functions of the machine 200 an authenticated user, authenticated device, or both can access; or a combination thereof.

In examples, the IAM machine 1100 can be configured to manage (e.g. create and remove) user accounts (e.g. user identities), enforce policies that define and manage access to functions of the machine 200, enable single sign-on access to functions of the machine 200, enable multifactor authentication (MFA), provide access auditing (e.g. tracking and logging user activity), or a combination thereof.

These management functions of the IAM machine 1100 can advantageously provide improved security over conventional devices. The IAM machine 1100 can also advantageously enable complying with regulatory requirements (e.g. PHI requirements, PII requirements, or both).

In examples, the IAM machine 1100 can enable multitenancy of the machine 200 by providing, across multiple tenants, centralized access management, centralized authentication, centralized authorization, data isolation (e.g. to logically separate and isolate data of different tenants), provide tenant-specific customization, provide scalability, or a combination thereof. The IAM machine 1100 can advantageously provide, over conventional devices, scalability, fast deployment, enhanced security, simple management of multiple tenants, customization, centralized control, reduce costs, or a combination thereof.

In examples, the IAM machine 1100 can be configured to receive, from at least one component of the machine 200, an electronic request to perform identity access management personal identity verification (e.g. verification of a user, a user device, or both). The IAM machine 1100 can be configured to accordingly perform identity access management personal identity verification. The IAM machine 1100 can be configured to transmit, to at least one component of the machine 200, an electronic message including results of identity access management personal identity verification.

In some examples, the electronic message including the results of identity access management personal identity verification can indicate a verification (e.g. enabling access to at least one function of the machine 200) of personal identity, while in other examples, the electronic message including the results of identity access management personal identity verification can indicate a failure to verify personal identity (e.g. denying access to at least one function of the machine 200).

In examples, the IAM machine 1100 can be configured to receive, from at least one component of the machine 200, an electronic request to perform identity access management personal identity authentication (e.g. authentication of a user, a user device, or both). The IAM machine 1100 can be configured to accordingly perform identity access management personal identity authentication. The IAM machine 1100 can be configured to transmit, to at least one component of the machine 200, an electronic message including results of identity access management personal identity authentication.

In some examples, the electronic message including the results of identity access management personal identity authentication can indicate a user as authentic, a user device as authentic, or both (e.g. enabling access to at least one function of the machine 200), while in other examples, the electronic message including the results of identity access management personal identity authentication can indicate a failure to authenticate identity of the user, the user device, or both (e.g. denying access to at least one function of the machine 200).

In examples, the IAM machine 1100 can be configured to receive, from at least one component of the machine 200, an electronic request to authenticate an application. The IAM machine 1100 can be configured to accordingly authenticate the application. The IAM machine 1100 can be configured to transmit, to at least one component of the machine 200, an electronic message including results of authenticating the application.

In some examples, the electronic message including the results of authenticating the application can indicate the application as authentic (e.g. enabling access to at least one function of the machine 200), while in other examples, the electronic message including the results of authenticating the application can indicate a failure to authenticate the application (e.g. denying access to at least one function of the machine 200).

We now turn to FIG. 12.

FIG. 12 depicts an electronic message service machine 1200, in accordance with an embodiment of the disclosure. In examples, the electronic message service machine 1200 can be a publicly accessible device, can transmit electronic messages via a publicly-accessible communication network (i.e. the Internet), or a combination thereof. In examples, the electronic message service machine 1200 can be a computer network enabled to allow anyone with appropriate technology to access and use the electronic message service machine 1200.

In examples, the electronic message service machine 1200 can be a message service device. In some embodiments, the electronic message service machine 1200 can be: (i) a short message service device; (ii) a multimedia messaging device; (iii) a rich communication services device; (iv) a text message server; (v) a chat message server; (vi) a messaging transmission channel device; (vii) a messaging channel delivery device; (viii) a cross-platform messaging service device; (ix) an email server; (x) an Internet messaging server; (xi) an instant messaging server; (xii) an encrypted messaging server; (xiii) a video conference server; (xiv) a message delivery channel device; (xv) a transmission delivery channel device; (xvi) a part of a multiprovider architecture; or (xvii) a combination thereof.

In examples, the electronic message service machine 1200 can receive a filtered electronic message from at least one component of the machine 200.

In examples, the electronic message service machine 1200 can include an application programming interface 1205 (API). The application programming interface 1205 can be a social media API, a messaging API (e.g. for SMS, chat, etc.), an email API, a message board API, a public forum API, a push notification API, or a combination thereof. The electronic message service machine 1200 can enable communicating with a user through at least one electronic messaging channel. An example, the communicating with the user can include sending a filtered electronic message to a user, receiving a response electronic message from the user, or a combination thereof.

In examples, the electronic message service machine 1200 can send (e.g. forward) electronic response message received from a user to at least one component of the machine 200. In examples, the electronic message service machine 1200 can send (e.g. forward) an electronic receipt message to at least one component of the machine 200. In examples, the electronic receipt message can indicate a filtered electronic message has been received by a user device that is an intended recipient of the filtered electronic message.

In examples, the electronic message service machine 1200 can send an electronic failure message to at least one component of the machine 200, where the electronic failure message indicates a failure to successfully send a filtered electronic message to a user. In examples, the electronic failure message can indicate a failure to receive electronic receipt message indicating a filtered electronic message has been received by a user device that is an intended recipient of the filtered electronic message.

We now turn to FIG. 13.

FIG. 13 depicts an example block diagram of an example method 1300 that can be used to implement automatically generating and using at least a portion of a machine configured to control sensitive content in an electronic message, in accordance with an embodiment of the disclosure. In an embodiment, the method 1300 can be implemented in a form of a set of computer-executable instructions. In examples, computer-executable instructions can include routines, programs, objects, components, data structures, procedures, operations, modules, functions, or a combination thereof, as non-limiting examples. Such computer-executable instructions can be executed by one or more programmed processors or co-processors, such as those described hereby.

The order in which the method 1300 is described is not intended to be construed as a limitation, and any number of the described features can be combined in any order to implement the method 1300 or alternate methods for automatically generating and using at least a portion of a machine configured to control sensitive content in an electronic message. Additionally, individual features can be omitted, as is practicable, from the method 1300 without departing from the scope of the subject matter described herein. Furthermore, the method 1300 can be implemented in any suitable hardware, software, firmware, or a combination thereof, such as the apparatus described hereby.

As shown in FIG. 13, at step 1305, one or more of the devices described herein can identify, using a computing device, a pattern match by applying an expression pattern matching algorithm to a body of an electronic message. The pattern match can identify a presence of a pattern in the body of the electronic message, a presence of a keyword in the body of the electronic message, or both. The pattern match can indicate a presence of sensitive information in the body of the electronic message being filtered.

In examples, the electronic message being filtered can be applied to a regular expression tester that captures defined patterns in a string (e.g. a message body) and outputs identified pattern matches. Each type of PII, PHI, sensitive information, or a combination thereof can have a regular expression tester pattern assigned thereto based on typical formats of the PII, PHI, sensitive information, or a combination thereof.

In some examples, the the method 1300 can further include receiving, at the computing device and from a subscribed application, an application programming interface call to initiate controlling of sensitive content in the electronic message.

In some examples, the the method 1300 can further include receiving, from a subscribed application, the electronic message having the pattern in the body of the electronic message, the keyword in the body of the electronic message, or both.

In some examples, the sensitive information in the body of the electronic message can include: personally identifiable information, personal health information, a postal address, a social security number, a phone number, privacy sensitive information, national security sensitive information, classified information, unclassified information, secret information, top secret information, or a combination thereof.

In some examples, the electronic message can be: addressed to multiple recipient user devices, in a plurality of electronic messages sent simultaneously, a text message, a text message sent in a bulk text, a short message service message, a multimedia message, a rich communication services message, an email, an instant message, an encrypted message, or a combination thereof.

In some embodiments, the electronic message can be received from a subscribed application and addressed to another application.

As shown in FIG. 13, at step 1310, one or more of the devices described herein can generate, using the computing device, a quantitative score indicating a validity of the sensitive information in the pattern match by using an artificial intelligence algorithm configured with a sensitive information entity model to analyze the pattern match. The quantitative score can indicate a probability of a presence of PII, PHI, sensitive information, or a combination thereof and the electronic message.

In some examples, the sensitive information entity model can be: a personally identifiable information entity model trained to analyze the pattern match, a personal health information entity model trained to analyze the pattern match, a postal address entity model trained to analyze the pattern match, a social security number entity model trained to analyze the pattern match, a phone number entity model trained to analyze the pattern match, a privacy sensitive information entity model trained to analyze the pattern match, a national security sensitive information entity model trained to analyze the pattern match, a classified information entity model trained to analyze the pattern match, a unclassified information entity model trained to analyze the pattern match, a secret information entity model trained to analyze the pattern match, a top secret information entity model trained to analyze the pattern match, or a combination thereof.

In examples, the artificial intelligence algorithm can scan any type of sensitive information included in a detection model engine. In examples, the artificial intelligence algorithm can be configured to scan any type of sensitive information included in a detection model engine.

As shown in FIG. 13, at step 1315, one or more of the devices described herein can determine, using the computing device and by applying a confidence calculator to the pattern match, a confidence score based on proximate content in the body of the electronic message. The proximate content is proximate to the pattern in the body of the electronic message, the keyword in the body of the electronic message, or both.

In examples, the confidence calculator can measure a context of a message body. In other words, the confidence calculator can generate a confidence score that is based upon text adjacent to a supposed instance of PII, PHI, sensitive information, or a combination thereof, rather than the instance of PII, PHI, sensitive information, or a combination thereof. The presence of certain keywords relating to each supposed instance of PII, PHI, sensitive information, or a combination thereof, as well as their distance (i.e. proximity) to the PII, PHI, sensitive information, or a combination thereof in the message body can be used by the confidence calculator output a qualitative score, such as a categorical score, in a form of a category. A categorical score can be a supplementary score using conjunction with the numerical score to output a final score indicating the presence of PII, PHI, sensitive information, or a combination thereof.

In some examples, the determining the confidence score can further include: calculating a distance between: (i) the pattern in the body of the electronic message or the keyword in the body of the electronic message and (ii) another keyword in the electronic message.

The confidence score can identify a severity of PII, PHI, sensitive information, or a combination thereof in the body the electronic message.

As shown in FIG. 13, at step 1320, one or more of the devices described herein can produce, using the computing device, a final score by applying an algorithm to the quantitative score and the confidence score. In non-limiting examples, the algorithm can be a Boolean algorithm.

In some examples, the method 1300 can further include comparing the final score to a threshold value to determine the final score indicates sensitive information is present in the electronic message. In an example, the threshold value can be received from a user device, such as an administrator user device. The threshold value can be a part of a scoring policy. In an example, requirements of the scoring policy can be received from a user device, such as an administrator user device.

As shown in FIG. 13, at step 1325, one or more of the devices described herein can send, from the computing device and when the final score indicates sensitive information is present in the electronic message, a request for review to an administrator user device. The request for review can include a copy of the electronic message, the final score, or both.

In some examples, the method 1300 can further include verifying registration of a subscribed application. The verifying the registration of the subscribed application can further include sending, from the computing device and to a database, a verification request including information describing the subscribed application. The verifying the registration of the subscribed application can further include receiving, at the computing device, a verification response from the database.

In some examples, the method 1300 can further include authenticating a subscribed application. The authentication can further include performing token-based authentication of the subscribed application. The authentication can further include sending, from the computing device and to an identity and access management device, an authentication request including information describing the subscribed application. The authentication can also include receiving, at the computing device and from the identity and access management device, an authentication response indicating the application is authentic.

In some examples, the method 1300 can further include publishing a quality management notification for message validation. In examples, message validation can be initiated in response to the published quality management notification.

In some examples, the method 1300 can further include validating a block list.

In some examples, the method 1300 can further include initiating, for a new message recipient, an opt-in process. The opt-in process can include sending an opt-in request via a message service device to a recipient user device. In response, an opt-in confirmation can be received via the message service device from the recipient user device. Then, in response to the opt-in confirmation, administration and configuration services of the computing device can be enabled via an application programming interface. The method 1300 can further include updating, in response to the enabling the administration and configuration services via the application programming interface, a database including information describing message recipients.

In some examples, the method 1300 can further include enabling an opt-In process with rule based compliance based on (e.g., in response to) a country-specific requirement. The country-specific requirement can require opting-in by a recipient user device, require opting-out by a recipient user device, require automatically opting-in by a recipient user device, or require automatically opting-out by a recipient user device. The country-specific requirement can require a default of opting-in by a recipient user device, require a default of opting-out by a recipient user device, require a default of automatically opting-in by a recipient user device or require a default of automatically opting-out by a recipient user device.

In some examples, the method 1300 can further include sending an electronic error message to the subscribed application from which the electronic message to be filtered was received, indicating that the electronic message was blocked. The blocked electronic message can be held for administrative review. An administrator user device can receive user input indicating whether or not the electronic message being held has PII, PHI, sensitive information, or combination thereof therein. The administrator user device can then keep blocking the electronic message or unblock the electronic message. The unblocked electronic message can then be transmitted to a recipient.

In some examples, the method 1300 can further include receiving, via the administrator user device, information indicating approval to send the electronic message. In response to the receiving the information indicating approval, the electronic message is sent to a recipient user device (e.g. via a message service device). Status update information can be stored in a database in response to receiving the information indicating approval.

In response to the sending the electronic message to the recipient user device via the message service device, a notification can be sent to the administrator user device. The notification can indicate the electronic message was sent to the recipient user device. In response to the electronic message being received by the recipient user device, a delivery confirmation message can be received via the message service device. The delivery confirmation message can include payload information. In examples the payload information can be forwarded to a return uniform resource locator of a subscribed application.

In examples, the message service device can be: a short message service device, a multimedia messaging device, a rich communication services device, a text message server, a chat message server, a messaging transmission channel device, a messaging channel delivery device, a cross-platform messaging service device, an email server, an Internet messaging server, an instant messaging server, an encrypted messaging server, a video conference server, a message delivery channel device, a transmission delivery channel device, a part of a multiprovider architecture, or a combination thereof.

In some examples, the method 1300 can further include sending, from the computing device and when the final score indicates sensitive information is present in the electronic message, an error message to the subscribed application. In examples the error message can be forwarded to a return uniform resource locator of a subscribed application.

In some examples, the method 1300 can further include training, using training information, the artificial intelligence algorithm to identify the presence of sensitive information in electronic messages. The training information can include digital information indicating electronic message content known to include sensitive information.

In examples, the provided artificial intelligence algorithm can be trained with training data made up of labeled data points in a dataset, thus providing an artificial intelligence model that can be used to make predictions. The predictions can produce a numerical score (i.e. a quantitative score) in a form of a percentage that shows a validity of an instance of PII, PHI, sensitive information, or a combination thereof.

In examples, the artificial intelligence algorithm is logically separated from a public-facing network, a publicly-accessible network, or a combination thereof. Doing so enables the artificial intelligence algorithm to perform as described hereby without sending or receiving sensitive information via a public-facing network, a public network, or both. Doing so beneficially reduces (if not eliminates) a possibility that sensitive information is leaked to a computing machine, network, or both that is publicly accessible. This technique may also be referred to herein as an "air-gapped" AI.

In examples, the method 1300 can further include receiving, from the administrator user device, a response to the request for review. Updated training information including at least a portion of the information in the electronic message can be produced in response to receiving the response to the request for review. The artificial intelligence algorithm can be retrained, automatically and using the updated training information, to identify the presence of sensitive information in electronic messages.

In examples, the method 1300 can further include training, using training information, the artificial intelligence algorithm to determine the confidence score. The training information can include digital information indicating electronic message content known to include sensitive information. In examples, the method 1300 can further include receiving, from the administrator user device, a response to the request for review. In response to receiving the response to the request for review, updated training information including at least a portion of the information in the electronic message can be produced. Then, the artificial intelligence algorithm can be retrained (e.g. automatically self-trained) with the updated training information to perform at least one function described hereby, such as determining the confidence score.

In examples, the method 1300 can further include configuring the expression pattern matching algorithm to match a specific pattern that is based on a format of a type of sensitive information. In examples, a response to the request for review can be received from the administrator user device and, in response, the expression pattern matching algorithm can be reconfigured (e.g. automatically) with a specific pattern based on a format of a type of sensitive information in at least a portion of the electronic message. In some examples, a scoring policy can be more aggressive for some types of patterns. In some examples the scoring policy can be less aggressive for some types of patterns.

In examples, the method 1300 can further include receiving, at the administrator user device, an identity verification card authentication request. The identity verification card authentication request can be sent to an identity and access management device to enable or deny (i) access to at least one computing device described herein, (ii) initiating at least a portion of a method described herein, (iii) performing at least a portion of a method described herein, or (iv) a combination thereof. The enabling or denial can be based on information stored by the identity verification card. In response, an identity verification card response can be received from the identity and access management device. In response to receiving the identity verification card response, an authentication token can be sent to the administrator user device when the identity verification card request yields enablement (i.e. approves access).

We now turn to FIG. 14.

FIG. 14 depicts a network implementation 1400 of a system 1402 suitable for implementing examples of the disclosed subject matter. In examples, one or more users can access the system 1402 through one or more user devices 1404-1, 1404-2 . . . 1404-N, collectively referred to as user devices 1404, hereinafter, or applications residing on the user devices 1404.

Although the disclosure is explained considering that the system 1402 is implemented on a server, the system 1402 can be implemented in other forms of a computing device or system, such as a laptop computer, a desktop computer, a notebook, a workstation, a virtual environment, a mainframe computer, a server, a network server, or a cloud-based computing environment. It will be understood that the system 1402 can be accessed by multiple users through one or more user devices 1404-1, 1404-2 . . . 1404-N.

In one implementation, the system 1402 can comprise a cloud-based computing environment in which the user can operate individual computing systems configured to execute remotely located applications. Examples of the user devices 1404 can include, but are not limited to, a portable computer, a personal digital assistant, a handheld device, a workstation, or a combination thereof. The user devices 1404 can be communicatively coupled to the system 1402 through a network 1406.

In one implementation, the network 1406 can be a wireless network, a wired network, or a combination thereof. The network 1406 can be implemented as one of several different types of networks, including but not limited to an intranet, local area network (LAN), wide area network (WAN), the Internet, or a combination thereof. The network 1406 can be a dedicated network or a shared network. A shared network can be an association of different types of networks that use a variety of protocols, for example, Hypertext Transfer Protocol (HTTP), Transmission Control Protocol/Internet Protocol (TCP/IP), or Wireless Application Protocol (WAP) to communicate with one another. Further, the network 1406 can include a variety of network devices, including routers, bridges, servers, computing devices, storage devices, or a combination thereof.

In an embodiment, system 1402 can include at least one processor 1408, an input/output (I/O) interface 1410, and a memory 1412. The processor 1408 can be implemented as one or more microprocessors, microcomputers, microcontrollers, digital signal processors, Central Processing Units (CPUs), state machines, logic circuitries, devices that manipulate signals based on operational instructions, or a combination thereof. Among other capabilities, the at least one processor 1408 can be configured to fetch and execute computer-readable instructions stored in the memory 1412.

The in/out (I/O) interface 1410 can include software and hardware interfaces, for example, a web interface, a graphical user interface (GUI, UI), and the like. The I/O interface 1410 can allow the system 1402 to interact with the user directly or through at least one of the client devices 1404-1 to 1404-N. Further, the I/O interface 1410 can enable the system 1402 to communicate with other computing devices, such as web servers and external data servers (not shown). The I/O interface 1410 can facilitate communications and data transfer within a wide variety of networks and protocol types, including wired networks (for example, Local Area Network or cable) and wireless networks (such as wireless local area network, a cellular network, or a satellite network). The I/O interface 1410 can include one or more ports for connecting a number of devices to one another or to another server.

The memory 1412 can include a computer-readable medium or computer program product. Non-limiting examples include volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 1412 can include routines, programs, objects, instructions, modules, components, or data structures which perform particular tasks or implement particular abstract data types. The memory 1412 can include programs or instructions that supplement applications and functions of the system 1402. In an embodiment, the memory 1412 can serve as a repository for storing data processed, received, generated or a combination thereof by one or more programs or coded instructions.

We now turn to FIG. 15.

FIG. 15 depicts an example diagram of an example computing device 1500 suitable for implementing examples of the disclosed subject matter. For example, at least a portion of the computing device 1500 can be suitable for use as a component part of the system 1402, at least one of the user devices 1404-1 to 1404-N, or a combination thereof. In another example, at least a portion of the computing device 1500 can be coupled to the network 1406.

In examples, a process management machine can include at least a portion of the example computing device 1500, at least a portion of the system 1402, or both, configured with computer-executable instructions to perform at least a portion of a technique described hereby, where the computer-executable instructions can be stored on a non-transitory computer-readable data storage device, a non-transitory computer-readable medium, or both.

In examples, aspects of the computing device 1500 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented in, and used with, hardware devices, computer network devices, the like, or a combination thereof. The configuration depicted in FIG. 15 is an illustrative example and is not limiting.

In some examples, the computing device 1500 can include a processor 1502, a data bus 1504, a memory 1506, a display 1508, a user interface 1510, a fixed storage device 1512, a removable storage device 1514, a network interface 1516, the like, or a combination thereof. These elements are described in further detail herein.

The processor 1502 can be a hardware-implemented processing unit configured to control at least a portion of operation of the computing device 1500. The processor 1502 can perform logical and arithmetic operations based on processor-executable instructions stored within the memory 1506. The processor 1502 can be configured to execute instructions that cause the processor 1502 to initiate at least a part of a method described hereby. In an example, the processor 1502 can interpret instructions stored in the memory 1506 to initiate at least a part of a method described hereby. In an example, the processor 1502 can execute instructions stored in the memory 1506 to initiate at least a part of a method described hereby. The processor 1502 can be configured to execute instructions that cause the processor 1502 to perform at least a part of a method described hereby. In an example, the processor 1502 can interpret instructions stored in the memory 1506 to perform at least a part of a method described hereby. In an example, the processor 1502 can execute instructions stored in the memory 1506 to perform at least a part of a method described hereby. The instructions, when executed by the processor 1502, can transform the processor 1502 into a special-purpose processor that causes the processor to perform limited functions including at least a part of a function described hereby. The processor 1502 can also be referred to as a central processing unit (CPU), a special-purpose processor (e.g. a non-generic processor), or both.

In some examples, the computing device 1500 can implement artificial intelligence techniques (e.g. using a Convolutional Neural Network (CNN), etc.) to collect information, process information, or both. In some examples, information stored in an information storage device of the computing device 1500 can be transferred to another computing device.

The processor 1502 can comprise or be a component of a physical processing system implemented with one or more processors. In some examples, the processor 1502 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 1504 can couple components of the computing device 1500. The data bus 1504 can enable information communication between the processor 1502 and one or more components coupled to the processor 1502. In some examples, the data bus 1504 can include a data bus, a power bus, a control signal bus, a status signal bus, the like, or a combination thereof. In an example, the components of the computing device 1500 can be communicatively coupled together to communicate with each other using a different suitable mechanism.

The memory 1506 generally represents any type or form of volatile storage device, non-volatile storage device, medium, the like, or a combination thereof. The memory 1506 can store data (e.g. a database), processor-readable instructions, the like, or a combination thereof. In an example, the memory 1506 can store data, load data, maintain data, or a combination thereof. In an example, the memory 1506 can store processor-readable instructions, load processor-readable instructions, maintain processor-readable instructions, or a combination thereof. In some embodiments, the memory 1506 can store computer-readable instructions configured to cause a processor (e.g. the processor 1502) to initiate performing at least a portion of a method described hereby. In some embodiments, the memory 1506 can store computer-readable instructions configured to cause a processor (e.g. the processor 1502) to perform at least a portion of a method described hereby. The memory 1506 can be a main memory configured to store an operating system, an application program, the like, or a combination thereof. The memory 1506 can store a basic input-output system (BIOS) which can control basic hardware operation such as interaction of the processor 1502 with peripheral components. The memory 1506 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 1506 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof which is configured to store information (e.g., data, processor-readable instructions, software, a database, the like, or a combination thereof) and is configured to provide the information to the processor 1502.

The display 1508 (i.e. a user display device) can include a component configured to visually convey information to a user of the computing device 1500. In examples, the display 1508 can be a video display screen, such as a light-emitting diode (LED) screen, a touch screen, or both. In examples, the display 1508 can display, such as via a user interface, information described herein, information produced by at least a portion of a method described herein, or both. In examples, the display 1508 can display a graphical user interface (GUI).

The user interface 1510 can include user devices such as a switch, a computer mouse, a trackpad, a keypad, a keyboard, a touch screen, a microphone, a speaker, an audio production device, a camera, a jack for coupling the computing device to an audio production device, the like, or a combination thereof. The user interface 1510 can optionally include a user interface controller. The user interface 1510 can include a component configured to convey information to a user of the computing device 1500, a component configured to receive information from the user of the computing device 1500, or both. In examples, the user interface 1510 can include the display 1508.

The fixed storage device 1512 can include one or more hard drive, flash storage device, the like, or a combination thereof. The fixed storage device 1512 can be an information storage device (e.g. storing a database) that is not configured to be removed during use. The fixed storage device 1512 can optionally include a fixed storage device controller. The fixed storage device 1512 can be integral with the computing device 1500 or can be separate and accessed through an interface.

The removable storage device 1514 can be integrated with the computing device 1500 or can be separated and accessed through other interfaces. The removable storage device 1514 can be an information storage device (e.g. storing a database) that is configured to be removed during use, such as a memory card, a jump drive, a flash storage device, an optical disk, the like, or a combination thereof. The removable storage device 1514 can optionally include a removable storage device controller. The removable storage device 1514 can be integrated with the computing device 1500 or can be separate and accessed through an interface.

In examples, a computer-readable storage medium such as one or more of the memory 1506, the fixed storage device 1512, the removable storage device 1514, a remote storage location, the like, or a combination thereof can store non-transitory computer-executable instructions configured to cause a processor (e.g. the processor 1502) to implement at least a portion of an aspect of the present disclosure.

The network interface 1516 can couple the processor 1502 (e.g. via the data bus 1504) to a network (e.g. network 1406 in FIG. 14) and enable exchanging information between the processor 1502 and the network. In some examples, the network interface 1516 can couple the processor 1502 (e.g. via the data bus 1504) to the network and enable exchanging information between the processor 1502 and another computing device. For example, the network interface 1516 can enable the processor 1502 to communicate with one or more other network devices. The network interface 1516 can couple to the network using any suitable technique and any suitable protocol. In some examples, the network interface 1516 can include a data bus, a power bus, a control signal bus, a status signal bus, the like, or a combination thereof. Example techniques and protocols the network interface 1516 can be configured to implement include digital cellular telephone, WiFi™, Bluetooth®, near-field communications (NFC), the like, or a combination thereof.

The network can couple the processor 1502 to one or more other network devices (e.g. user devices 1404-1, 1404-2 . . . 1404-N in FIG. 14). In some examples, the network can enable exchange of information between the processor 1502 and the one or more other network devices. In some examples, the network can enable exchange of information between the processor 1502 and another computing device. The network can include one or more private networks, local networks, wide-area networks, the Internet, other communication networks, the like, or a combination thereof. In some examples, the network can be a wired network, a wireless network, an optical network, the like, or a combination thereof.

In some embodiments, the network device can store computer-readable instructions configured to cause a processor (e.g. the processor 1502) to initiate performing at least a portion of a method described hereby. In an example, the one or more other network devices can store non-transitory computer-executable instructions configured to cause a processor (e.g. the processor 1502) to implement at least an aspect of the present disclosure. The non-transitory computer-executable instructions can be received by the processor 1502 and implemented using at least a portion of techniques described hereby. In another example, information described hereby can be stored in the fixed storage device 1512, the removable storage device 1514, the network device, the like, or a combination thereof.

Figure 16:
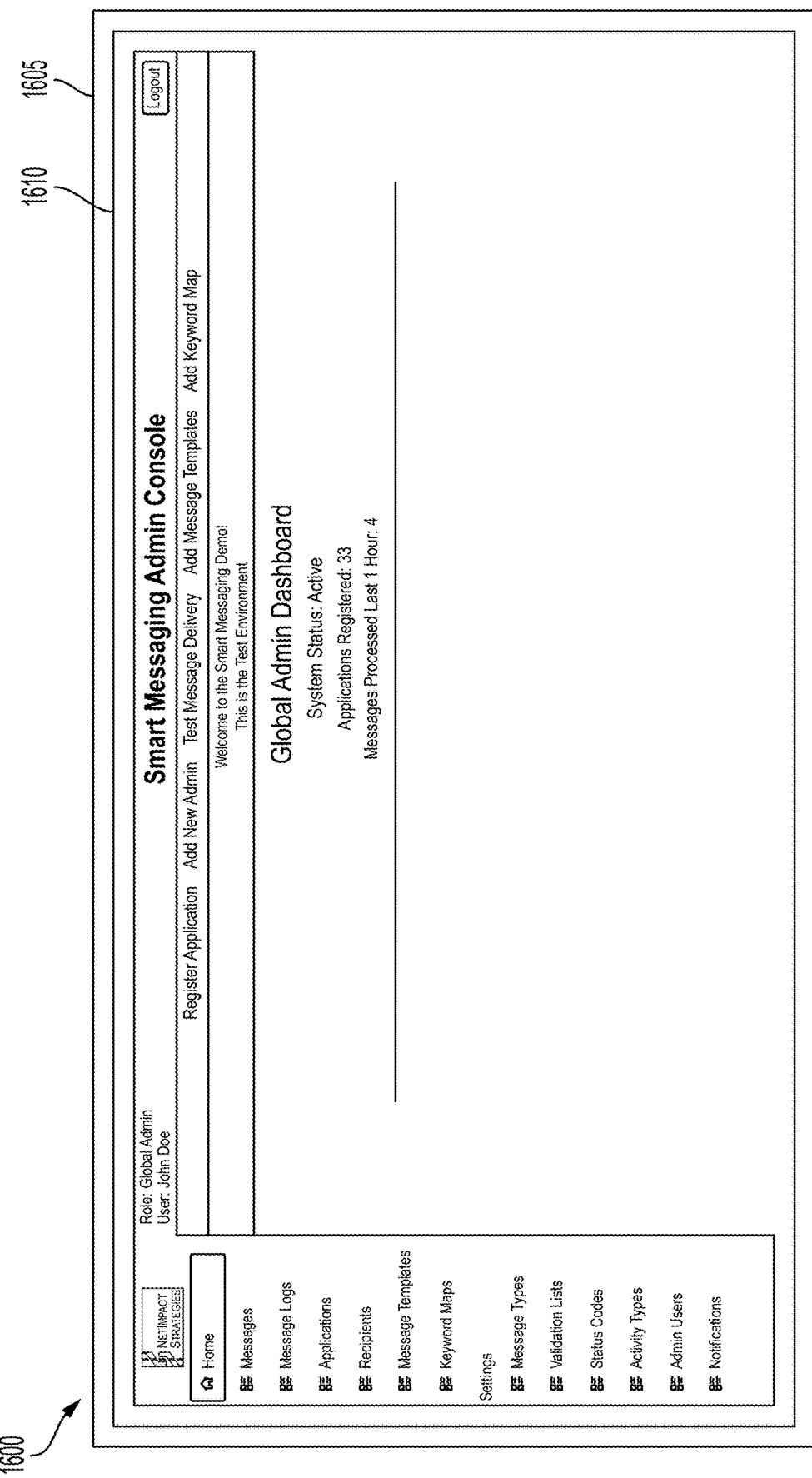
FIG. 16 is a diagram depicting a non-limiting example user interface including a user display or portion thereof with an administrator console page of a graphical user interface of a machine configured to control sensitive content in an electronic message, in accordance with an embodiment of the disclosure.

We now turn to FIG. 16.

FIG. 16 is a diagram depicting a non-limiting example user interface 1600 including a user display or portion thereof 1605 with an administrator console page 1610 of a graphical user interface of a machine configured to control sensitive content in an electronic message, in accordance with an embodiment of the disclosure. The administrator console page 1610 can enable a user to view information describing status of aspects of the machine 200 of FIG. 2, control aspects of the machine 200 of FIG. 2, decide of a message is to be transmitted via the public message service machine 1200, or a combination thereof.

The administrator console page 1610 can include information describing: a dashboard, a system status, a status of a registered application, a number of registered applications, a number of messages processed per unit of time, a message, a message log, a recipient, a message template, a keyword map, a message type, a validation list and contents thereof, a status code, an activity type, an administrative user, a notification, or a combination thereof. The administrator console page 1610 can include at least one user input portion enabling a user to select a submenu configured to access information describing: a message, a message log, a recipient, a message template, a keyword map, a message type, a validation list and contents thereof, a status code, an activity type, an administrative user, a notification, or a combination thereof.

The administrator console page 1610 can include at least one user input portion enabling a user to perform actions such as, and not limited to: registering an application, unregistering an application, adding a new administrator, removing a new administrator, delivering a test message, adding a message template, removing a message template, adding a keyword map, removing a keyword map, or a combination thereof.

Exemplary embodiments discussed herein can provide certain advantages. These advantages can include those provided by the disclosed features.

Although systems and methods for automatically generating and using at least a portion of a machine configured to control sensitive content in an electronic message are described hereby in a language specific to structural features and/or methods, the appended claims are not necessarily limited to the specific features or methods described. Rather, the specific features and methods are disclosed as examples of implementations for generating and using at least a portion of a machine configured to control sensitive content in an electronic message.

One or more embodiments of the disclosed subject matter are described herein with specificity to meet statutory requirements, but this description does not limit the scope of the claims. The claimed subject matter can be embodied in other ways, can include different elements or steps, and can be used in conjunction with other existing or later developed technologies. This description should not be interpreted as implying any required order or arrangement among or between various steps or elements except when the order of individual steps or arrangement of elements is explicitly noted as being required.

Embodiments of the disclosure are described more fully herein with reference to the accompanying drawings, which form a part hereof, and which show, by way of illustration, exemplary embodiments by which the disclosure can be practiced. The disclosure may, however, be embodied in different forms and should not be construed as limited to the embodiments set forth herein, rather, these embodiments are provided so that this disclosure will satisfy the statutory requirements and convey the scope of the disclosure to those skilled in the art.

Among others, the subject matter of the disclosure can be embodied in whole or in part as a system, as one or more methods, or as one or more devices. Embodiments can take the form of a hardware implemented embodiment, a software implemented embodiment, or an embodiment combining software and hardware aspects. For example, in some embodiments, one or more of the operations, functions, processes, or methods disclosed and/or described herein can be implemented by one or more suitable processing elements (such as a processor, co-processor, microprocessor, Central Processing Unit, Graphics Processing Unit, Tensor Processing Unit, Quantum Processing Unit, controller, or a combination thereof, as non-limiting examples) that is part of a client device, server, network element, remote platform (such as a Software as a Service (SaaS) platform), an "in the cloud" service, or other form of computing or data processing system, device, or platform.

The processing element or elements can be programmed with a set of executable instructions (e.g. software instructions), where the instructions can be stored on (or in) one or more suitable non-transitory computer-readable data storage elements, one or more suitable non-transitory computer-readable media, or both. In an embodiment, the set of instructions can be conveyed to a user through a transfer of instructions or an application that executes a set of instructions (such as over a network, e.g., the Internet). In an embodiment, a set of instructions or an application can be utilized by an end-user through access to a SaaS platform or a service provided through such a platform.

In an embodiment, the systems and methods disclosed herein can provide services through a SaaS or multi-tenant platform. The platform provides access to multiple entities, each with a separate account and associated data storage. Each account can correspond to a User, set of Users, an entity, a set or category of entities, a company, a business advisor, a set or category of Users, an industry, an organization, or a combination thereof, as examples. Each account can access one or more services, a set of which are instantiated in their account, and which implement at least a portion of one or more of the methods, features, or functions disclosed herein.

In an embodiment, one or more of the operations, functions, processes, features, or methods disclosed herein can be implemented by a specialized form of hardware, such as a programmable gate array, application specific integrated circuit (ASIC), or the like. An embodiment of the disclosure can be implemented in the form of an application, a subroutine that is part of a larger application, a "plug-in," an extension to the functionality of a data processing system or platform, or other suitable form. This description is, therefore, not to be taken in a limiting sense.

It should be understood that the present invention as described herein can be implemented in a form of control logic using computer software in a modular or integrated manner. Based on the disclosure and teachings provided herein, a person of ordinary skill in the art will know and appreciate other techniques to implement an embodiment of the disclosure using hardware or a combination of hardware and software.

Any of the software components, processes or functions described in this application can be implemented as software code to be executed by a processor using any suitable computer language such as at least one of Python, Java, JavaScript, C, C++, C#("C Sharp"), Type Script, Java Script, Platform Client Application Programming Interface (API) Script, or Perl using procedural, functional, object-oriented, or other techniques. The software code can be stored as a series of instructions, or commands in (or on) a non-transitory computer-readable medium, such as a random-access memory (RAM), a read only memory (ROM), a magnetic medium such as a hard-drive, a jump drive, an optical medium such as a CD-ROM, or a combination thereof. In this context, a non-transitory computer-readable medium is almost any medium suitable for the storage of data or an instruction set aside from a transitory waveform. Any such computer readable medium can reside on or within a single computational apparatus and can be present on or within different computational apparatuses within a system or network.

The systems and methods described herein are directed to improvements in computer-readable media arts, and improve the functioning of computer-readable media and computers executing instructions stored on the computer-readable media. For example, the provided methods and apparatuses particularly improve the functioning of computer-readable media storing instructions that, when executed by a processor, control content in an electronic message.

According to one example implementation, the term processing element or processor, as used herein, can be a central processing unit (CPU), or conceptualized as a CPU (such as a virtual machine). In this example implementation, the CPU or a device in which the CPU is incorporated can be at least one of coupled, connected, or in communication with one or more peripheral devices, such as the user display device. In another example implementation, the processing element or processor can be incorporated into a mobile computing device, such as a smartphone or tablet computer.

The non-transitory computer-readable storage medium referred to herein can include a number of physical drive units, such as a redundant array of independent disks (RAID), a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium can include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. In some embodiments, one or more of the blocks, or stages or steps may not necessarily need to be performed in the order presented or may not necessarily need to be performed.

The computer-executable program instructions described herein can be loaded onto a special purpose computer, a processor, or other programmable data processing apparatus to produce a specific example of a machine, such that the instructions executed by the computer, processor, or other programmable data processing apparatus create means for implementing one or more of the functions, operations, processes, or methods described herein. In examples, these computer program instructions can also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein. In examples, these computer program instructions can also be stored in a computer-readable memory that can direct a computer or other programmable data processing apparatus to function in a specific manner, such that the instructions stored in the computer-readable memory produce an article of manufacture storing instructions that implement, initiate, or both, at least a portion of one or more of the functions, operations, processes, methods or a combination thereof, as described hereby. Descriptions herein to information describing an aspect can describe digital information (e.g., non-transitory machine-processable digital electronic information) describing the aspect. In an example, a feature disclosed hereby can be described by digital information describing the feature.

The systems and methods described herein are directed to improvements to computer functionality, and improve the functioning of computers. For example, the provided methods and apparatuses particularly improve the functioning of computers that control content in an electronic message.

The systems and methods described herein are directed to improvements in artificial intelligence algorithms, and improve the functioning of artificial intelligence algorithms and computers executing the artificial intelligence algorithms. For example, the provided methods and apparatuses particularly improve the functioning of artificial intelligence algorithms that control content in an electronic message.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation. Unless described otherwise herein, the examples provided hereby are nonlimiting.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims when they have structural elements, functional elements, or both that do not differ from the literal language of the claims, or if they include structural elements, functional elements, or both with insubstantial differences from the literal language of the claims.

The use of the terms "a," "an," "the," and similar referents in the specification and in the following claims are to be construed to cover both the singular and the plural, unless otherwise indicated herein or clearly contradicted by context. The singular portends the plural, where practicable. The terms "having," "including," "containing," and similar referents in the specification and in the claims are to be construed as open-ended terms (e.g. meaning "including, but not limited to,") unless otherwise noted. All methods described herein can be performed in any suitable order unless otherwise indicated herein or clearly contradicted by context. The use of all examples, or exemplary language (e.g. "such as") provided herein, is intended merely to better illuminate embodiments of the disclosure and do not pose a limitation to the scope of the invention unless otherwise claimed. No language in the specification should be construed as indicating any non-claimed element as essential to each embodiment of the present invention.

The words "receiving," "generating," "extracting," "determining," "calculating," and other forms thereof are intended to be open ended in that an item or items following any one of these words is not meant to be an exhaustive listing of such item or items or meant to be limited to only the listed item or items. The term "or" is used inclusively to refer to items in the alternative and in combination.

Different arrangements of the components depicted in the drawings or described above, as well as components and steps not shown or described are possible. Similarly, some features and sub-combinations are useful and can be employed without reference to other features and sub-combinations. Embodiments of the invention have been described for illustrative and not restrictive purposes, and alternative embodiments will become apparent to readers of this patent. Accordingly, the present invention is not limited to the embodiments described herein or depicted in the drawings, and various embodiments and modifications can be made without departing from the scope of the claims. The disclosed embodiments are merely exemplary of the disclosure, which can be embodied in various forms.

What is claimed is:

1. A computer-implemented method for automatically generating at least a portion of a machine configured to control sensitive content in an electronic message, the method being performed by a computing device comprising at least one processor, the method comprising:

identifying, by the computing device, a pattern match by applying an expression pattern matching algorithm to a body of the electronic message, wherein the pattern match:

identifies a presence of a pattern in the body of the electronic message, a presence of a keyword in the body of the electronic message, or both; and indicates a presence of sensitive information in the body of the electronic message;

generating, by the computing device, a quantitative score indicating a validity of the sensitive information in the pattern match by using an artificial intelligence algorithm configured with a sensitive information entity model to analyze the pattern match;

determining, by the computing device and by applying a confidence calculator to the pattern match, a confidence score based on proximate content in the body of the electronic message, wherein the proximate content is proximate to the pattern in the body of the electronic message, the keyword in the body of the electronic message, or both;

producing, by the computing device, a final score by applying an algorithm to the quantitative score and the confidence score; and sending, from the computing device and when the final score indicates sensitive information is present in the electronic message, a request for review to an administrator user device, wherein the request for review includes a copy of the electronic message and the final score.

2. The computer-implemented method of claim 1, further comprising:

receiving, at the computing device and from a subscribed application, an application programming interface call to initiate controlling of sensitive content in the electronic message.

3. The computer-implemented method of claim 1, further comprising:

receiving, from a subscribed application, the electronic message having the pattern in the body of the electronic message, the keyword in the body of the electronic message, or both.

4. The computer-implemented method of claim 1, further comprising:

verifying registration of a subscribed application.

5. The computer-implemented method of claim 4, wherein the verifying the registration of the subscribed application further comprises:

sending, from the computing device and to a database, a verification request including information describing the subscribed application; and receiving, at the computing device, a verification response from the database.

6. The computer-implemented method of claim 1, further comprising:

authenticating a subscribed application;

performing token-based authentication of the subscribed application; or both.

7. The computer-implemented method of claim 6, wherein the authenticating the subscribed application further comprises:

sending, from the computing device and to an identity and access management device, an authentication request including information describing the subscribed application; and receiving, at the computing device and from the identity and access management device, an authentication response indicating the application is authentic.

8. The computer-implemented method of claim 1, further comprising:

publishing a quality management notification for message validation; and initiating, in response to the published quality management notification, message validation.

9. The computer-implemented method of claim 1, further comprising:

validating a block list.

10. The computer-implemented method of claim 1, further comprising:

initiating, for a new message recipient, an opt-in process comprising:

sending an opt-in request via a message service device to a recipient user device;

receiving an opt-in confirmation via the message service device from the recipient user device; and enabling, in response to the opt-in confirmation, administration and configuration services of the computing device via an application programming interface.

11. The computer-implemented method of claim 10, further comprising:

updating, in response to the enabling the administration and configuration services via the application programming interface, a database including information describing message recipients.

12. The computer-implemented method of claim 1, wherein the sensitive information in the body of the electronic message includes:

personally identifiable information;

personal health information;

a postal address;

a social security number;

a phone number;

privacy sensitive information;

national security sensitive information;

privacy sensitive information;

national security sensitive information;

classified information;

unclassified information;

secret information;

top secret information; or a combination thereof.

13. The computer-implemented method of claim 1, wherein the determining the confidence score further comprises:

calculating a distance between:

the pattern in the body of the electronic message or the keyword in the body of the electronic message; and another keyword in the electronic message.

14. The computer-implemented method of claim 1, wherein the sensitive information entity model is:

a personally identifiable information entity model trained to analyze the pattern match;

a personal health information entity model trained to analyze the pattern match;

a postal address entity model trained to analyze the pattern match;

a social security number entity model trained to analyze the pattern match;

a phone number entity model trained to analyze the pattern match;

a privacy sensitive information entity model trained to analyze the pattern match;

a national security sensitive information entity model trained to analyze the pattern match;

a classified information entity model trained to analyze the pattern match;

a unclassified information entity model trained to analyze the pattern match;

a secret information entity model trained to analyze the pattern match;

a top secret information entity model trained to analyze the pattern match; or a combination thereof.

15. The computer-implemented method of claim 1, further comprising:

comparing the final score to a threshold value to determine the final score indicates sensitive information is present in the electronic message.

16. The computer-implemented method of claim 1, further comprising:

receiving, via the administrator user device, information indicating approval to send the electronic message; and sending, in response to the receiving the information indicating approval, the electronic message to a recipient user device via a message service device.

17. The computer-implemented method of claim 16, further comprising:

sending, in response to the sending the electronic message to the recipient user device via the message service device, a notification to the administrator user device that the electronic message was sent.

18. The computer-implemented method of claim 16, further comprising:

receiving a delivery confirmation message via the message service device, wherein the delivery confirmation message includes payload information; and forwarding, to a return uniform resource locator of a subscribed application, the payload information.

19. The computer-implemented method of claim 16, further comprising:

storing, in response to the receiving the information indicating approval, status update information in a database.

20. The computer-implemented method of claim 16, wherein the message service device is:

a short message service device;

a multimedia messaging device;

a rich communication services device;

a text message server;

a chat message server;

a messaging transmission channel device;

a messaging channel delivery device;

a cross-platform messaging service device;

an email server;

an Internet messaging server;

an instant messaging server;

an encrypted messaging server;

a video conference server;

a message delivery channel device;

a transmission delivery channel device;

a part of a multiprovider architecture; or a combination thereof.

21. The computer-implemented method of claim 1, further comprising:

sending, from the computing device and when the final score indicates sensitive information is present in the electronic message, an error message to the subscribed application.

22. The computer-implemented method of claim 1, further comprising:

training, using training information, the artificial intelligence algorithm to identify the presence of sensitive information in electronic messages, wherein:

the training information includes digital information indicating electronic message content known to include sensitive information; and the artificial intelligence algorithm is logically separated from a public-facing network.

23. The computer-implemented method of claim 22, further comprising:

receiving, from the administrator user device, a response to the request for review;

producing, in response to receiving the response to the request for review, updated training information including at least a portion of the information in the electronic message; and retraining, automatically and using the updated training information, the artificial intelligence algorithm to identify the presence of sensitive information in electronic messages.

24. The computer-implemented method of claim 1, further comprising:

training, using training information, the artificial intelligence algorithm to determine the confidence score, wherein:

the training information includes digital information indicating electronic message content known to include sensitive information; and the artificial intelligence algorithm is logically separated from a public-facing network.

25. The computer-implemented method of claim 24, further comprising:

receiving, from the administrator user device, a response to the request for review;

producing, in response to receiving the response to the request for review, updated training information including at least a portion of the information in the electronic message; and retraining, automatically and using the updated training information, the artificial intelligence algorithm to determine the confidence score.

26. The computer-implemented method of claim 1, further comprising:

configuring the expression pattern matching algorithm to match a specific pattern that is based on a format of a type of sensitive information.

27. The computer-implemented method of claim 26, further comprising:

receiving, from the administrator user device, a response to the request for review; and reconfiguring, automatically and in response to receiving the response to the request for review, the expression pattern matching algorithm with a specific pattern based on a format of a type of sensitive information in at least a portion of the electronic message.

28. The computer-implemented method of claim 1, further comprising:

receiving, at the administrator user device, an identity verification card authentication request;

sending the identity verification card authentication request to an identity and access management device;

receiving an identity verification card response from the identity and access management device; and sending, in response to receiving the identity verification card response, an authentication token to the administrator user device.

29. The computer-implemented method of claim 1, wherein the electronic message is:

addressed to multiple recipient user devices;

in a plurality of electronic messages sent simultaneously;

a text message;

a text message sent in a bulk text;

a short message service message;

a multimedia message;

a rich communication services message;

an email;

an instant message;

an encrypted message; or a combination thereof.

30. The computer-implemented method of claim 1, wherein the electronic message is received from a subscribed application and addressed to another application.

\* \* \* \* \*